United States Patent
Yin et al.

(10) Patent No.: US 12,273,174 B2
(45) Date of Patent: Apr. 8, 2025

(54) POLARIZATION DIVERSITY IN TIME-DOMAIN BEAMFORMING

(71) Applicant: Telefonaktiebolaget LM Ericsson (publ), Stockholm (SE)

(72) Inventors: Zhiming Yin, Danderyd (SE); Magnus Hurd, Stockholm (SE); Jonas Karlsson, Upplands Väsby (SE); Jing Rao, Sollentuna (SE); Svante Bergman, Hägersten (SE); Fredrik Ovesjö, Älvsjö (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 18/703,065

(22) PCT Filed: Oct. 19, 2021

(86) PCT No.: PCT/IB2021/059634
§ 371 (c)(1),
(2) Date: Apr. 19, 2024

(87) PCT Pub. No.: WO2023/067373
PCT Pub. Date: Apr. 27, 2023

(65) Prior Publication Data
US 2024/0421879 A1    Dec. 19, 2024

(51) Int. Cl.
*H04B 7/06* (2006.01)
*H04B 7/08* (2006.01)
(Continued)

(52) U.S. Cl.
CPC ......... *H04B 7/0689* (2013.01); *H04B 7/0871* (2013.01); *H04B 7/10* (2013.01); *H04L 1/1893* (2013.01)

(58) Field of Classification Search
CPC ............... H04B 7/0452; H04B 7/0689; H04B 7/0871; H04B 7/10; H04L 1/1893
See application file for complete search history.

(56) References Cited

U.S. PATENT DOCUMENTS 10,506,587 B2 * 12/2019 Guo ..................... H04W 16/28
2012/0201319 A1    8/2012 Asplund et al.
(Continued)

FOREIGN PATENT DOCUMENTS

WO    2020153881 A1    7/2020

OTHER PUBLICATIONS

International Search Report and Written Opinion of the International Searching Authority, PCT/IB2021/059634, mailed Sep. 7, 2022, 18 pages.
(Continued)

*Primary Examiner* — Alpus Hsu
(74) *Attorney, Agent, or Firm* — Sage Patent Group

(57) ABSTRACT

A network node, computer program product, and a method by a network node to allocate at least two beams in a slot to schedule multiple user equipments, UEs, are provided. Each UE is allocated to a baseband port of a plurality of baseband ports such that there is more than one UE allocated to each baseband port. For each baseband port of the plurality of baseband ports: the baseband port is mapped to a polarization of an antenna having multiple polarizations and to one beam of a plurality of beams. The polarization of a baseband port is switched in a time domain to create time diversity of services towards the multiple UEs, wherein a UE is subject to a first polarization for a subset of time occasions and to a second polarization for other time occasions.

14 Claims, 10 Drawing Sheets

(51) Int. Cl.
*H04B 7/10* (2017.01)
*H04L 1/1867* (2023.01)

(56) References Cited

U.S. PATENT DOCUMENTS

| | | | | |
|---|---|---|---|---|
| 2019/0190582 A1* | 6/2019 | Guo | .................... | H04B 17/327 |
| 2019/0394757 A1* | 12/2019 | Zhang | ................ | H04W 72/044 |
| 2020/0044801 A1* | 2/2020 | Wang | .................... | H04L 5/0094 |
| 2020/0136680 A1 | 4/2020 | Kim et al. | | |
| 2020/0162144 A1 | 5/2020 | Zhou et al. | | |
| 2020/0351827 A1* | 11/2020 | Chae | .................... | H04L 5/0023 |
| 2021/0029707 A1 | 1/2021 | Xu et al. | | |
| 2021/0321373 A1* | 10/2021 | Rahman | ................ | H04L 5/0096 |
| 2021/0321378 A1* | 10/2021 | Rahman | ................ | H04W 72/21 |
| 2022/0022180 A1* | 1/2022 | Rahman | ................ | H04L 5/0023 |

OTHER PUBLICATIONS

Written Opinion of the International Preliminary Examining Authority, PCT/IB2021/059634, mailed Oct. 20, 2023, 9 pages.

International Preliminary Report on Patentability of the International Preliminary Examining Authority, PCT/IB2021/059634, mailed Jan. 29, 2024, 22 pages.

3GPP TS 38.211 V15.7.0 (Sep. 2019); 3rd Generation Partnership Project; Technical Specification Group Radio Access Network; NR; Physical channels and modulation (Release 15), 97 pages.

3GPP TS 38.331 V15.7.0 (Sep. 2019); 3rd Generation Partnership Project; Technical Specification Group Radio Access Network; NR; Radio Resource Control (RRC) protocol specification (Release 15), 527 pages.

3GPP TS 38.321 V15.7.0 (Sep. 2019); 3rd Generation Partnership Project; Technical Specification Group Radio Access Network; NR; Medium Access Control (MAC) protocol specification (Release 15), 78 pages.

3GPP TS 38.212 V15.7.0 (Sep. 2019); 3rd Generation Partnership Project; Technical Specification Group Radio Access Network; NR; Multiplexing and channel coding (Release 15), 101 pages.

3GPP TS 38.214 V15.7.0 (Sep. 2019); 3rd Generation Partnership Project; Technical Specification Group Radio Access Network; NR; Physical layer procedures for data (Release 15), 106 pages.

* cited by examiner

RESPONSIVE TO THERE BEING A SWITCH IN POLARIZATION WITHIN A SLOT, PROVIDE A DEMODULATION REFERENCE SIGNAL, DM-RS, FOR THE UE TO ESTIMATE THE CHANNEL IN REGARD TO UPCOMING SYMBOLS BY PERFORMING CHANNEL ESTIMATION WITHOUT ANY FILTERING
901

PROVIDE AN INDICATION TO THE UE TO ENABLE OR DISABLE DM-RS FILTERING WHEN PERFORMING MEASUREMENTS ON THE DM-RS
903

DYNAMICALLY SCHEDULE A PHYSICAL DOWNLINK SHARED CHANNEL FOR WHICH DM-RS FILTERING IS ENABLED OR DISABLED BY THE UE BASED ON THE INDICATION
905

Figure 9

RECEIVE FROM A NETWORK AN ALLOCATION OF THE UE TO A BASEBAND PORT OF A PLURALITY OF BASEBAND PORTS WHERE THERE IS MORE THAN ONE UE ALLOCATED TO EACH OF THE PLURALITY OF BASEBAND PORTS, EACH BASEBAND PORT MAPPED TO A POLARIZATION OF AN ANTENNA HAVING MULTIPLE POLARIZATIONS AND TO ONE BEAM OF A PLURALITY OF BEAMS, WHEREIN THE UE IS SUBJECT TO A FIRST POLARIZATION FOR A SUBSET OF TIME OCCASIONS AND TO A SECOND POLARIZATION FOR OTHER TIME OCCASIONS
1001

RECEIVE AN INDICATION OF WHETHER OR NOT TO DISABLE DEMODULATION REFERENCE SIGNAL, DM-RS, FILTERING WHEN PERFORMING MEASUREMENTS ON A DM-RS
1003

PERFORM MEASUREMENTS ON THE DM-RS BASED ON THE INDICATION
1005

Figure 10

DYNAMICALLY RECEIVE SCHEDULING OF A PHYSICAL DOWNLINK SHARED CHANNEL FOR WHICH DM-RS FILTERING IS ENABLED OR DISABLED BY THE UE BASED ON THE INDICATION
1101

Figure 11

POLARIZATION DIVERSITY IN TIME-DOMAIN BEAMFORMING

CROSS REFERENCE TO RELATED APPLICATIONS

This application is a 35 U.S.C. § 371 national stage application of PCT International Application No. PCT/IB2021/059634 filed on Oct. 19, 2021, the disclosure and content of which is incorporated by reference herein in its entirety.

TECHNICAL FIELD

The present disclosure relates generally to communications, and more particularly to communication methods and related devices and nodes supporting wireless communications.

BACKGROUND

Time-domain beamforming means one beamform applies to all frequency resources part of a transmission in one time slot. Typically, a set of predefined beamforms are designed to cover a certain spatial area such as seen in FIG. 1, where each beamform includes two orthogonal polarizations, such as horizontal and vertical polarization. The presence of two polarizations allows the option to transmit two data streams independent from the other.

Based on user equipment (UE) feedback (either formulated as a report indicating a preferred beamform or simply based on a physical measurement of received power per predefined beamform), the base station would transmit on one of these beamforms accordingly to communicate a message to the UE. This means only users being associated to a beamform currently selected by the base station can be served at one point in time, the other users need to wait until the base station selects a beamform of their preference. This beamforming constraint is the essence of time-domain beamforming, as illustrated in FIG. 2 where only one beamform happens at one particular time instant.

One approach to improve latency for time-domain beamforming is to introduce MU-MIMO (Multi-User-Multiple-Input, Multiple-Output) transmissions. This means one frequency-time resource is used to carry two different data streams, each targeting a different user (in other words a different UE). This way the latency is potentially reduced by a half assuming two users can be found to engage in a MU-MIMO transmission. The benefit of MU-MIMO could be more than reduced latency. For example, if there are many small packet users or low-throughput video users, MU-MIMO transmissions can also improve cell throughput.

Some AAS (Advanced Antenna Systems) systems intended for time-domain beamforming apply spatial beamforming per polarization. This means transmission on one polarization may be assigned a beamform covering a certain area whereas transmission on the other polarization is assigned another beamform covering some other area. Of course, the beamforms of the polarizations may be selected to be the same; in fact, this would be the typical operational mode to offer UEs two-layer single user-MIMO (SU-MIMO) transmissions. Then both polarizations in any transmission like reference signals for beam management and channel state information (CSI) estimation as well as data transmissions on shared channel (physical downlink shared channel (PDSCH)/physical uplink shared channel (PUSCH)) would be subject to the same analog beamform.

SUMMARY

For AAS systems intended for time-domain beamforming that applies spatial beamforming per polarization, there are opportunities to serve UEs associated to different beamforms (directions). For a SU-MIMO approach both polarizations are assigned the same predefined beam in each slot. If there are multiple users in the cell distributed in different areas (each covered by different beams), then users not scheduled in the slot will have to wait regardless of if there are still unused resources. This results in lower cell throughput and increased latency.

Introducing the option of having UEs of several areas/directions/beamforms served at one point in time can be done in a couple of ways. First, regarding multi-directional time domain beamforming, there are two problems. One problem is that users' frequency domain resources cannot overlap with each other. The other problem is that because each directional beamform covers several directions for the full frequency range, a data allocation for a user in some part of the frequency spectrum would need also to radiate energy in a direction towards a user in another direction (however served by another part of the frequency spectrum). In other words, the power resource cannot be used efficiently.

Second, for MU-MIMO solutions based on allocating different beamforms per polarization there is a mismatch between CSI measurements by the UE and upcoming transmissions. UEs measure on a channel state information-reference signal (CSI-RS) with 2 antenna ports whereas the base station is only capable of beamforming on a per-port basis. The reporting of RI/PMI/CQI (rank indicator/precoding matrix indicator/channel quality information) involves both of the antenna ports (of the CSI-RS) where each port represents one polarization. If the beamforming is only capable of operating on a per-port basis, a UE would receive a signal only over one of the ports at a MU-MIMO transmission (the other port is allocated to the other UE). It could happen that one of the UEs is allocated to a port (or polarization) not performing well.

According to some embodiments of inventive concepts, a method by a network node to allocate two beams in a slot to schedule multiple user equipments (UEs) includes allocating each UE to a baseband port of a plurality of baseband ports such that there is more than one UE allocated to each of the plurality of baseband ports. The method includes, for each baseband port of the plurality of baseband ports: mapping the baseband port to a polarization of an antenna having multiple polarizations and to one beam of a plurality of beams and switching the polarization of a baseband port in a time domain to create time diversity of services towards the multiple UEs, wherein a UE is subject to a first polarization for a subset of time occasions and to a second polarization for other time occasions.

Network nodes and computer program products configured to perform analogous embodiments are provided.

Certain embodiments may provide one or more of the following technical advantage(s). With scheduling two (groups of) users in one slot, cell throughput will be improved when there are multiple users in the cell. This is because more resources can be allocated to more users compared to scheduling one user on a frequency-time resource. In addition, this solution is not subject to waste of power as for multi-directional time domain beamforming.

Switching polarization (in time domain) for users involved in MU-MIMO transmissions achieves a diversity gain. A user would experience less latency by allowing multiple users to be served on the same frequency-time resource.

According to some other embodiments of inventive concepts, a method by a user equipment, UE, in a network where a network node allocates two beams in a slot to schedule multiple user equipments, UEs, includes receiving from a network an allocation of the UE to a baseband port of a plurality of baseband ports where there is more than one UE allocated to each of the plurality of baseband ports, each baseband port mapped to a polarization of an antenna having multiple polarizations and to one beam of a plurality of beams, wherein the UE is subject to a first polarization for a subset of time occasions and to a second polarization for other time occasions. The method includes receiving an indication of whether or not to disable demodulation reference signal, DM-RS, filtering when performing measurements on a DM-RS. The method includes performing measurements on the DM-RS based on the indication.

Communication devices and computer program products configured to perform analogous embodiments are provided.

BRIEF DESCRIPTION OF THE DRAWINGS

The accompanying drawings, which are included to provide a further understanding of the disclosure and are incorporated in and constitute a part of this application, illustrate certain non-limiting embodiments of inventive concepts. In the drawings:

FIGS. 8-9 are flow charts illustrating operations of a network node according to some embodiments of inventive concepts;

FIGS. 10-11 are flow chart illustrating operations of a user equipment, UE, according to some embodiments of inventive concepts;

DETAILED DESCRIPTION

Some of the embodiments contemplated herein will now be described more fully with reference to the accompanying drawings. Embodiments are provided by way of example to convey the scope of the subject matter to those skilled in the art, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of present inventive concepts to those skilled in the art. It should also be noted that these embodiments are not mutually exclusive. Components from one embodiment may be tacitly assumed to be present/used in another embodiment.

As previously indicated, with scheduling two (groups of) users in one slot, cell throughput will be improved when there are multiple users in the cell. This is because more resources can be allocated to more users compared to scheduling one user on a frequency-time resource. In addition, this solution is not subject to waste of power as for multi-directional time domain beamforming. Various embodiments of inventive concepts are based on switching of polarization: one embodiment means no impact on 3GPP standardization (inter-slot switching and intra-slot switching for uplink); the other solution is subject to 3GPP impact but would at the same time allow higher level of coding gain for downlink transmissions (intra-slot switching for downlink).

Terminology

Baseband port: takes one stream of baseband data as input. It is assumed that the baseband port is associated to one polarization of the AAS.

Antenna port: contrary to a baseband port, this is a 3rd generation partnership project (3GPP) concept. The antenna port is defined by transmissions on resource elements that are part of a CSI-RS resource. A CSI-RS resource can correspond to different number of antenna ports (in this text CSI-RS resource with one and two antenna ports appear), and each antenna port is composed of a subset of resource elements in the CSI-RS resource (unless it is a one-port CSI-RS resource).

Beam: represented by a set of weights, one for each antenna element involved in the transmission. Each set of weights applies to one polarization/panel; in other words, one beam per polarization/panel.

Figure 1:
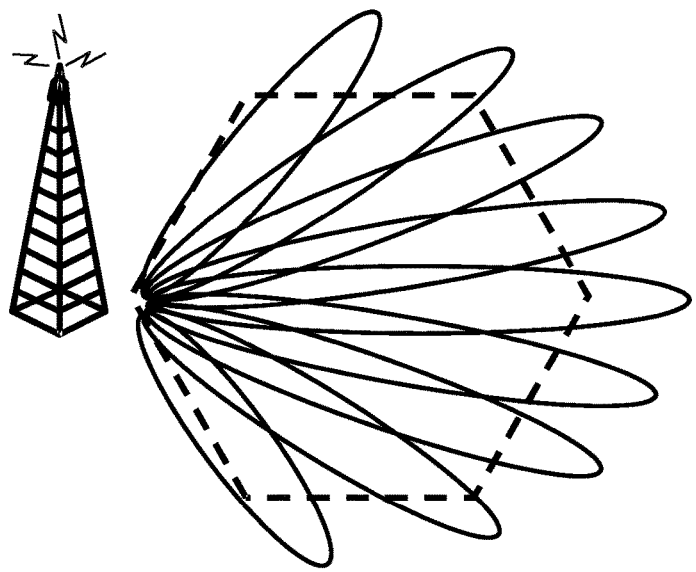
FIG. 1 is a block diagram illustrating a predefined grid of dual-polarized beams according to some embodiments.
Figure 2:
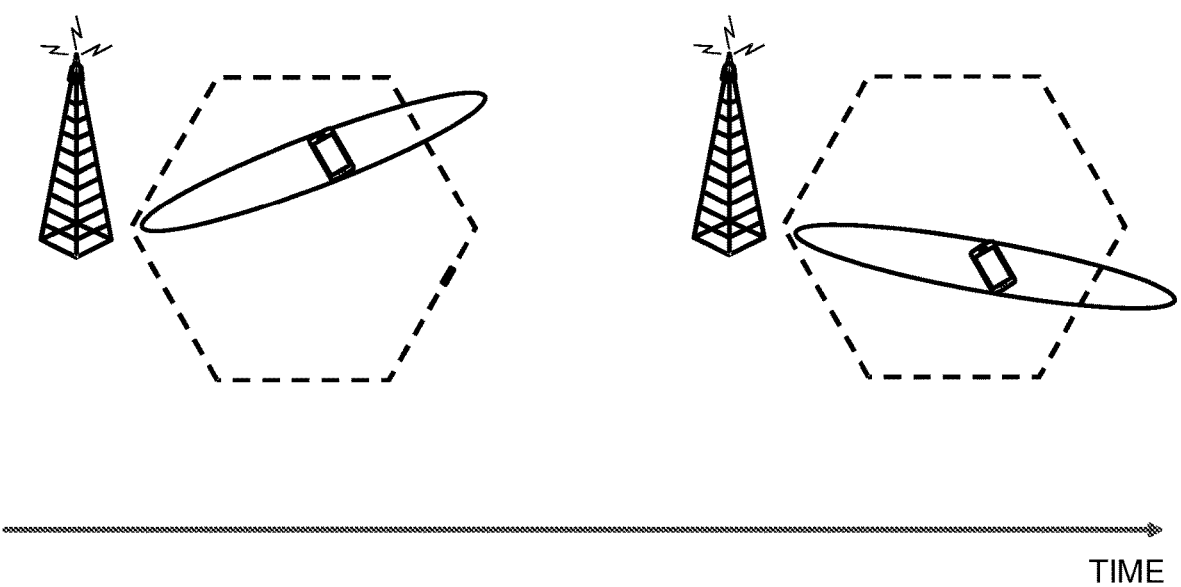
FIG. 2 is a block diagram illustrating time-domain beamforming according to some embodiments.
Figure 3:
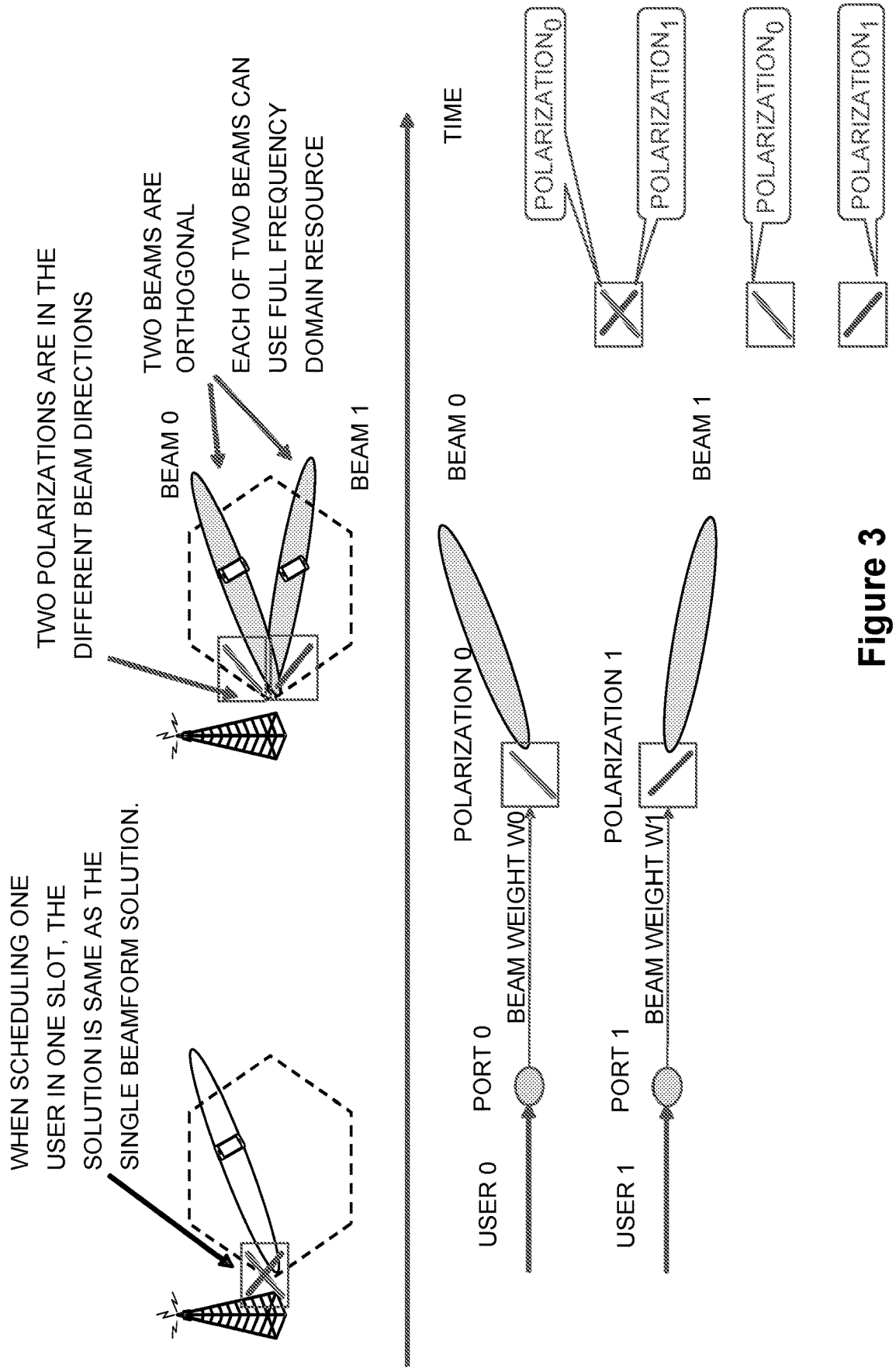
FIG. 3 is a block diagram illustrating single-beamform versus polarization based dual-beamform construction according to some embodiments of inventive concepts.

FIG. 3 illustrates a single-beamform vs polarization based dual-beamform construction. For the dual-beamform construction, a system with two baseband ports shall be used to describe some embodiments. The two baseband ports shall be designated baseband port 0 and baseband port 1. Baseband port 0 is mapped to antenna polarization 0, and baseband port 1 is mapped to antenna polarization 1. Beam 0 is associated to baseband port 0, and beam 1 is associated to baseband port 1. FIG. 3 shows how polarizations and beams relate to each other.

Assume there are two users in the cell: user 0 and user 1. To schedule multiple users in one slot, user 0 is allocated to baseband port 0, and user 1 is allocated to baseband port 1. Similarly, two groups of users can be allocated to baseband port 0 and baseband port 1 if those users are located in the coverage area of a respective beam. The users in each group are multiplexed in frequency.

The principle behind various embodiments is to overrule the RI/PMI from the reported CSI feedback (which typically indicates a precoder involving both polarizations) intended for SU-MIMO transmissions. Instead, allocate one polarization (using one beam) to serve one user and use the other polarization (using another beam) to serve another user. Even if the two users are allocated to the same frequency-time resource the transmissions to the two users are orthogonal due to the different polarization.

A key aspect of some embodiments of inventive concepts addresses this in that since the CSI feedback is based on both polarizations, this results in suboptimal precoding at MU-MIMO transmissions for PDSCH. To combat the suboptimal precoding used for PDSCH transmissions at MU-MIMO one can switch polarization in time domain (to create time diversity of the service towards the UE). For example, for a user 0 one may allocate polarization 0 for a subset of the time occasions and polarization 1 for the other time occasions. Another user involved in the same MU-MIMO transmissions would be assigned the opposite polarization. Diversity gain from switching polarization could be beneficial in scenarios such as Fixed Wireless Access (FWA) in case one polarization might not work well (this would be particularly problematic since the radio channel is not expected to change in this case).

Switching within a slot would allow error-correcting mechanisms related to transport block functionality to mitigate more strongly any impact from transmitting on a bad polarization. However, each time there is a switch within the slot there needs to be a Demodulation reference signal (DM-RS) for the UE to estimate the channel in regard to the upcoming symbols. In NR there could be up to 4 occasions of DM-RS (one or two symbols wide) in a slot, so this means one could switch polarization up to four times (counting the initial occasion in the slot as a switch). However, this requires the UE to perform channel estimation without any filtering (such as interpolation) to make any sense. This filtering aspect is not subject to standardization; it is quite likely the UEs would perform interpolation between the DM-RS occasions in the slot in order to manage channel estimates for a high-speed UE. In the present case, it is the base station that intentionally changes the channel to get a diversity gain, such that filtering/interpolation would only jeopardize the integrity of the channel estimate. In the case of the high-speed UE on the other hand, it is actually the UE that causes the channel to change, and the filtering is the gNB's approach to possibly estimate the channel on time occasions when there are no DM-RS available (for a UE that is assumed to move rapidly).

Some of the various embodiments introduce into the standard the option to configure measurements on DM-RS without filtering in the UE. There are four alternatives to implement this shown as below.

One alternative is to add a new optional parameter dmrs-NoFilteringWithinSlot in the ControlResourceSet information element in the 3GPP Technical Specification (TS) 38.331 as follows marked by italics and double underlines. The parameter dmrs-NoFilteringWithinSlot indicates whether DM-RS of the PDSCH scheduled by the PDCCH allocated to the CORESET should be subject to filtering or not. When MU-MIMO is scheduled, the ControlResourceSet with the new parameter can be sent to the UE to disable DM-RS filtering. Another CORESET can be defined without dmrs-NoFilteringWithinSlot defined enabling gNB to dynamically schedule PDSCH with DM-RS filtering or not, depending on which CORESET the PDCCH is allocated to.

```
ControlResourceSet ::=            SEQUENCE {
    controlResourceSetId              ControlResourceSetId,
    frequencyDomainResources          BIT STRING (SIZE (45)),
    duration                          INTEGER (1..maxCoReSetDuration),
    cce-REG-MappingType               CHOICE {
        interleaved                       SEQUENCE {
            reg-BundleSize                    ENUMERATED {n2, n3, n6},
            interleaverSize                   ENUMERATED {n2, n3, n6},
            shiftIndex    INTEGER(0..maxNrofPhysicalResourceBlocks-1)      OPTIONAL -- Need S
        },
        nonInterleaved                    NULL
    },
    precoderGranularity               ENUMERATED {sameAsREG-bundle, allContiguousRBs},
    tci-StatesPDCCH-ToAddList         SEQUENCE(SIZE (1..maxNrofTCI-StatesPDCCH)) OF
TCI-StateId OPTIONAL, -- Cond NotSIB1-initialBWP
    tci-StatesPDCCH-ToReleaseList     SEQUENCE(SIZE (1..maxNrofTCI-StatesPDCCH)) OF
TCI-StateId OPTIONAL, -- Cond NotSIB1-initialBWP
    tci-PresentInDCI                  ENUMERATED {enabled}          OPTIONAL, -- Need S
    pdcch-DMRS-ScramblingID           INTEGER (0..65535)            OPTIONAL, -- Need S
    dmrs-NoFilteringWithinSlot            ENUMERATED {enabled}
OPTIONAL, -- Need S
    ...,
    [[
    rb-Offset-r16                     INTEGER (0..5)                OPTIONAL, -- Need S
    tci-PresentDCI-1-2-r16            INTEGER (1..3)                OPTIONAL, -- Need S
    coresetPoolIndex-r16              INTEGER (0..1)                OPTIONAL, -- Need S
    controlResourceSetId-v1610        ControlResourceSetId-v1610    OPTIONAL -- Need S
    ]]
}
```

ControlResourceSet field descriptions dmrs-NoFilteringWithinSlot
This field indicates if the UE filters PDSCH DMRS within a slot. The value enabled means PDSCH DMRS scheduled by the PDCCH cannot be filtered within a slot. When the field is absent, the UE PDSCH DMRS may be filtered.

Another alternative is to add a similar new parameter dmrs-NoFilteringWithinSlot in the DMRS-DownlinkConfig information element in the 3GPP TS 38.331 specification as follows marked by italics and double underlines:

```
-- ASN1START
-- TAG-DMRS-DOWNLINKCONFIG-START
DMRS-DownlinkConfig ::=      SEQUENCE {
  dmrs-Type                  ENUMERATED {type2}                    OPTIONAL,  -- Need S
  dmrs-AdditionalPosition    ENUMERATED {pos0, pos1, pos3}         OPTIONAL,  -- Need S
  maxLength                  ENUMERATED {len2}                     OPTIONAL,  -- Need S
  scramblingID0              INTEGER (0..65535)                    OPTIONAL,  -- Need S
  scramblingID1              INTEGER (0..65535)                    OPTIONAL,  -- Need S
  phaseTrackingRS            SetupRelease { PTRS-DownlinkConfig }  OPTIONAL,  -- Need M
  dmrs-NoFilteringWithinSlot         ENUMERATED{enabled}
           OPTIONAL,  -- Need S
  ...,
  [[
  dmrs-Downlink-r16          ENUMERATED {enabled}                  OPTIONAL  -- Need R
  ]]
}
-- TAG-DMRS-DOWNLINKCONFIG-STOP
-- ASN1STOP
```

Another alternative is based on introducing a new MAC Control element (CE), for example, a new MAC CE "DMRS No Filtering Within Slot Activation/Deactivation MAC CE" can be added in the 3GPP TS 38.321 specification. The network may activate and deactivate the PDSCH DM-RS filtering within a slot by sending a "DMRS No Filtering Within Slot Activation/Deactivation MAC CE".

The MAC entity would, upon receiving a DMRS No Filtering Within Slot Activation/Deactivation MAC CE on a Serving Cell, indicate to lower layers the information regarding the DMRS No Filtering Within Slot Activation/Deactivation MAC CE.

Figure 4:
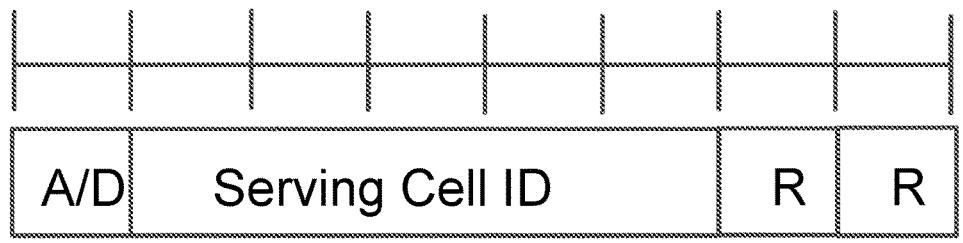
FIG. 4 is an illustration of a demodulation reference signal, DMRS (also referred to as DM-RS and dmrs), No Filtering Within Slot Activation/Deactivation MAC CE according to some embodiments of inventive concepts.

The DMRS No Filtering Within Slot Activation/Deactivation MAC CE would be identified by a MAC subheader with a Logical Channel ID (LCID) specified in Table 6.2.1-1 in the 3GPP TS 38.321 specification. It has a fixed size of 8 bits with the following fields shown in FIG. 4 as an example. More formats can be defined for more flexible configuration.

A/D: This field indicates whether to activate or deactivate no filtering for DM-RS within a slot. The field is set to 1 to indicate activation, otherwise it indicates deactivation;

Serving Cell ID: This field indicates the identity of the Serving Cell for which the MAC CE applies. The length of the field is 5 bits;

R: Reserved bit, set to 0.

Another alternative is to use DCI (Downlink Control Information) to tell the UE about the DM-RS no filtering information. A new information field can be added in DCI format 1_1 in the 3GPP TS 38.212 specification as below:

Enable DM-RS no filtering within a slot by setting the bit to:

1 if a new higher layer parameter such as pdsch-DmrsNoFilteringWithinSlot is defined and configured.

0 otherwise.

Another way of achieving the effects from switching within a slot is to switch the polarization for potential HARQ retransmissions in response to failure of decoding the initial/retransmitted HARQ transmissions. The combined initial transmissions/retransmissions would protect the transport block from any quality reduction as a result from ill-performing polarization. In any case, the option to perform inter-slot switching remains. It is assumed that there is no interpolation/filtering between slots, since this is effectively precluded by the following formulation in the 3GPP TS 38.211 specification, section 4.4.1:

"For DM-RS associated with a PDSCH, the channel over which a PDSCH symbol on one antenna port is conveyed can be inferred from the channel over which a DM-RS symbol on the same antenna port is conveyed only if the two symbols are within the same resource as the scheduled PDSCH, in the same slot, and in the same PRG as described in clause 5.1.2.3 of [6, TS 38.214]."

Both downlink and uplink can apply this beam allocation solution. For uplink it is the gNB that performs channel estimation; gNB can therefore decide not to perform filtering/interpolation if there is any switching of polarization (applies for intra- or inter-slot switching).

If transmission of Sounding Reference Signal (SRS) is used (to support uplink transmissions) to estimate the link, reception of SRS can be organized to happen on different polarizations. This way, the gNB would have a clear view on SINR per UE and polarization; accordingly, opportunities for MU-MIMO transmissions on uplink to potentially get high throughput can be analyzed.

Inspired by SRS based solution for uplink MU-MIMO, reciprocity-based approach to use uplink SRS detection results showing which polarization has better channel quality can be used for downlink. It means that the downlink PDSCH can use selected uplink polarization for MU-MIMO transmission. Switching polarization could be considered for other modes of AAS technology than time-domain beamforming. In frequency-domain beamforming, there is typically a smallest unit of resource representing several PRBs considered by scheduling. For many users producing only small packets, it may be possible to schedule two users on this smallest unit of resource by exploiting the polarization degrees of freedom. This would be a very simple MU-MIMO approach. Switching polarization as described herein would then achieve reliability through the diversity gain.

The approach here is applied to switching polarization when the beam directions to UEs are known. However, the approach can be applied to switching between any precoders (a precoder is a set of complex weights per antenna element) when there is uncertainty on which one is the best.

As described above, the various embodiments allocate multiple users in two beams with alternating (with respect to time) polarizations in one slot to improve the network capacity and/or reduce the traffic latency. The alternating of polarizations is to achieve a diversity gain.

Figure 5:
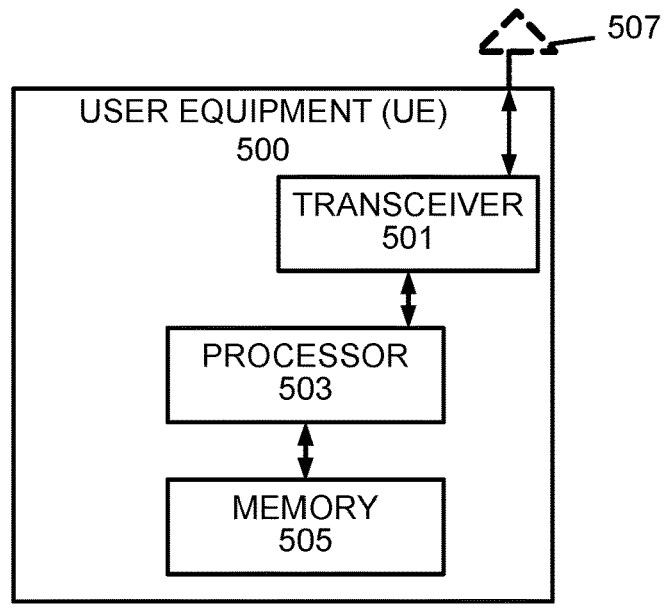
FIG. 5 is a block diagram illustrating a UE according to some embodiments of inventive concepts.

FIG. 5 is a block diagram illustrating elements of a UE 500 (also referred to as a mobile terminal, a mobile communication terminal, a wireless device, a wireless communication device, a wireless terminal, mobile device, a wireless communication terminal, user equipment, UE, a user equipment node/terminal/device, etc.) configured to provide wireless communication according to embodiments of inventive concepts. (UE 500 may be provided, for example, as discussed below with respect to wireless devices UE 1212A, UE 1212B, and wired or wireless devices UE 1212C, UE 1212D of FIG. 12, UE 1300 of FIG. 13, virtualization hardware 1604 and virtual machines 1608A, 1608B of FIG. 16, and UE 1706 of FIG. 17, all of which should be considered interchangeable in the examples and embodiments described herein and be within the intended scope of this disclosure, unless otherwise noted.) As shown, UE may include an antenna 507 (e.g., corresponding to antenna 1322 of FIG. 13), and transceiver circuitry 501 (also referred to as a transceiver, e.g., corresponding to interface 1312 of FIG. 13 having transmitter 1318 and receiver 1320) including a transmitter and a receiver configured to provide uplink and downlink radio communications with a base station(s) (e.g., corresponding to network node 1210A, 1210B of FIG. 12, network node 1400 of FIG. 14, and network node 1704 of FIG. 17 also referred to as a RAN node) of a radio access network. UE may also include processing circuitry 503 (also referred to as a processor, e.g., corresponding to processing circuitry 1302 of FIG. 13, and control system 1612 of FIG. 16) coupled to the transceiver circuitry, and memory circuitry 505 (also referred to as memory, e.g., corresponding to memory 1310 of FIG. 12) coupled to the processing circuitry. The memory circuitry 505 may include computer readable program code that when executed by the processing circuitry 503 causes the processing circuitry to perform operations according to embodiments disclosed herein. According to other embodiments, processing circuitry 503 may be defined to include memory so that separate memory circuitry is not required. UE may also include an interface (such as a user interface) coupled with processing circuitry 503, and/or UE may be incorporated in a vehicle.

As discussed herein, operations of UE may be performed by processing circuitry 503 and/or transceiver circuitry 501. For example, processing circuitry 503 may control transceiver circuitry 501 to transmit communications through transceiver circuitry 501 over a radio interface to a radio access network node (also referred to as a base station) and/or to receive communications through transceiver circuitry 501 from a RAN node over a radio interface. Moreover, modules may be stored in memory circuitry 505, and these modules may provide instructions so that when instructions of a module are executed by processing circuitry 503, processing circuitry 503 performs respective operations (e.g., operations discussed below with respect to Example Embodiments relating to wireless communication devices). According to some embodiments, a UE 500 and/or an element(s)/function(s) thereof may be embodied as a virtual node/nodes and/or a virtual machine/machines.

Figure 6:
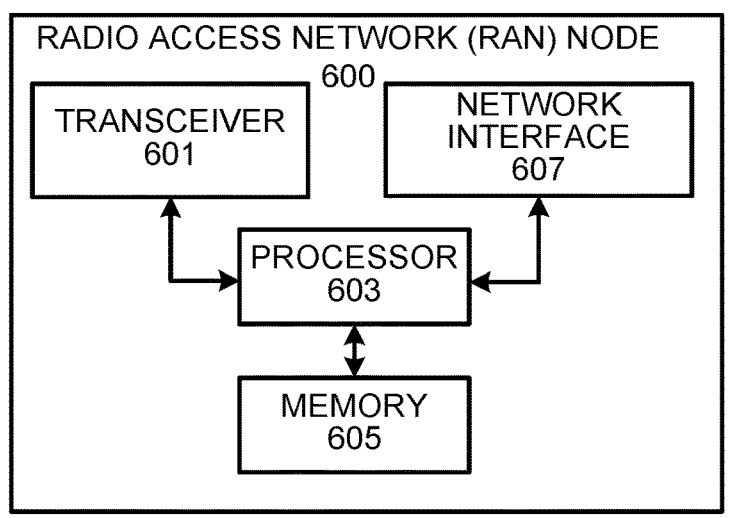
FIG. 6 is a block diagram illustrating a radio access network, RAN, node (e.g., a base station eNB/gNB) according to some embodiments of inventive concepts.

FIG. 6 is a block diagram illustrating elements of a radio access network RAN node 600 (also referred to as a network node, base station, eNodeB/eNB, gNodeB/gNB, etc.) of a Radio Access Network (RAN) configured to provide cellular communication according to embodiments of inventive concepts. (RAN node 600 may be provided, for example, as discussed below with respect to network node 1210A, 1210B of FIG. 12, network node 1400 of FIG. 14, hardware 1604 or virtual machine 1608A, 1608B of FIG. 16, and/or base station 1704 of FIG. 17, all of which should be considered interchangeable in the examples and embodiments described herein and be within the intended scope of this disclosure, unless otherwise noted.) As shown, the RAN node may include transceiver circuitry 601 (also referred to as a transceiver, e.g., corresponding to portions of RF transceiver circuitry 1412 and radio front end circuitry 1418 of FIG. 14) including a transmitter and a receiver configured to provide uplink and downlink radio communications with mobile terminals. The RAN node may include network interface circuitry 607 (also referred to as a network interface, e.g., corresponding to portions of communication interface 1406 of FIG. 14) configured to provide communications with other nodes (e.g., with other base stations) of the RAN and/or core network CN. The network node may also include processing circuitry 603 (also referred to as a processor, e.g., corresponding to processing circuitry 1402 of FIG. 14) coupled to the transceiver circuitry, and memory circuitry 605 (also referred to as memory, e.g., corresponding to memory 1404 of FIG. 14) coupled to the processing circuitry. The memory circuitry 605 may include computer readable program code that when executed by the processing circuitry 603 causes the processing circuitry to perform operations according to embodiments disclosed herein. According to other embodiments, processing circuitry 603 may be defined to include memory so that a separate memory circuitry is not required.

As discussed herein, operations of the RAN node may be performed by processing circuitry 603, network interface 607, and/or transceiver 601. For example, processing circuitry 603 may control transceiver 601 to transmit downlink communications through transceiver 601 over a radio interface to one or more mobile terminals UEs and/or to receive uplink communications through transceiver 601 from one or more mobile terminals UEs over a radio interface. Similarly, processing circuitry 603 may control network interface 607 to transmit communications through network interface 607 to one or more other network nodes and/or to receive communications through network interface from one or more other network nodes. Moreover, modules may be stored in memory 605, and these modules may provide instructions so that when instructions of a module are executed by processing circuitry 603, processing circuitry 603 performs respective operations (e.g., operations discussed below with respect to Example Embodiments relating to RAN nodes). According to some embodiments, RAN node 600 and/or an element(s)/function(s) thereof may be embodied as a virtual node/nodes and/or a virtual machine/machines.

According to some other embodiments, a network node may be implemented as a core network CN node without a transceiver. In such embodiments, transmission to a wireless UE may be initiated by the network node so that transmission to the wireless UE is provided through a network node including a transceiver (e.g., through a base station or RAN node). According to embodiments where the network node is a RAN node including a transceiver, initiating transmission may include transmitting through the transceiver.

Figure 7:
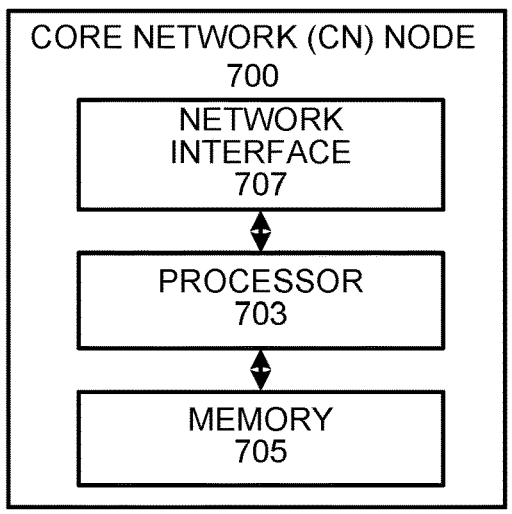
FIG. 7 is a block diagram illustrating a core network, CN, node (e.g., an AMF node, an SMF node, etc.) according to some embodiments of inventive concepts.

FIG. 7 is a block diagram illustrating elements of a core network (CN) node (e.g., an SMF (session management function) node, an AMF (access and mobility management function) node, etc.) of a communication network configured to provide cellular communication according to embodiments of inventive concepts. (CN node 700 may be provided, for example, as discussed below with respect to core network node 1208 of FIG. 12, hardware 1604 or virtual machine 1608A, 1608B of FIG. 16, all of which should be considered interchangeable in the examples and embodiments described herein and be within the intended scope of this disclosure, unless otherwise noted.) As shown, the CN node may include network interface circuitry 707 configured to provide communications with other nodes of the core network and/or the radio access network RAN. The CN node may also include a processing circuitry 703 (also referred to as a processor) coupled to the network interface circuitry, and memory circuitry 705 (also referred to as memory) coupled to the processing circuitry. The memory circuitry 705 may include computer readable program code that when executed by the processing circuitry 703 causes the processing circuitry to perform operations according to embodiments disclosed herein. According to other embodiments, processing circuitry 703 may be defined to include memory so that a separate memory circuitry is not required.

As discussed herein, operations of the CN node may be performed by processing circuitry 703 and/or network interface circuitry 707. For example, processing circuitry 703 may control network interface circuitry 707 to transmit communications through network interface circuitry 707 to one or more other network nodes and/or to receive communications through network interface circuitry from one or more other network nodes. Moreover, modules may be stored in memory 705, and these modules may provide instructions so that when instructions of a module are executed by processing circuitry 703, processing circuitry 703 performs respective operations (e.g., operations discussed below with respect to Example Embodiments relating to core network nodes). According to some embodiments, CN node 700 and/or an element(s)/function(s) thereof may be embodied as a virtual node/nodes and/or a virtual machine/machines.

In the description that follows, while the network node may be any of the RAN node 600, network node 1210A, 1210B, 1400, 1706, hardware 1604, or virtual machine 1608A, 1608B, the RAN node 600 shall be used to describe the functionality of the operations of the network node. Similarly, wherein the UE may be any of the UE 500, UE 1212A, UE 1212B, UE 1212C, UE 1212D, UE 1300, virtualization hardware 1604, virtual machine 1608A, virtual machine 1608B, or UE 1706, the UE 500 shall be used to describe the functionality of the operations of the UE 500. Operations of the RAN node 600 (implemented using the structure of FIG. 6) will now be discussed with reference to the flow charts of FIGS. 8 and 9 according to some embodiments of inventive concepts. For example, modules may be stored in memory 605 of FIG. 6, and these modules may provide instructions so that when the instructions of a module are executed by respective RAN node processing circuitry 603, processing circuitry 603 performs respective operations of the flow charts.

Figure 8:
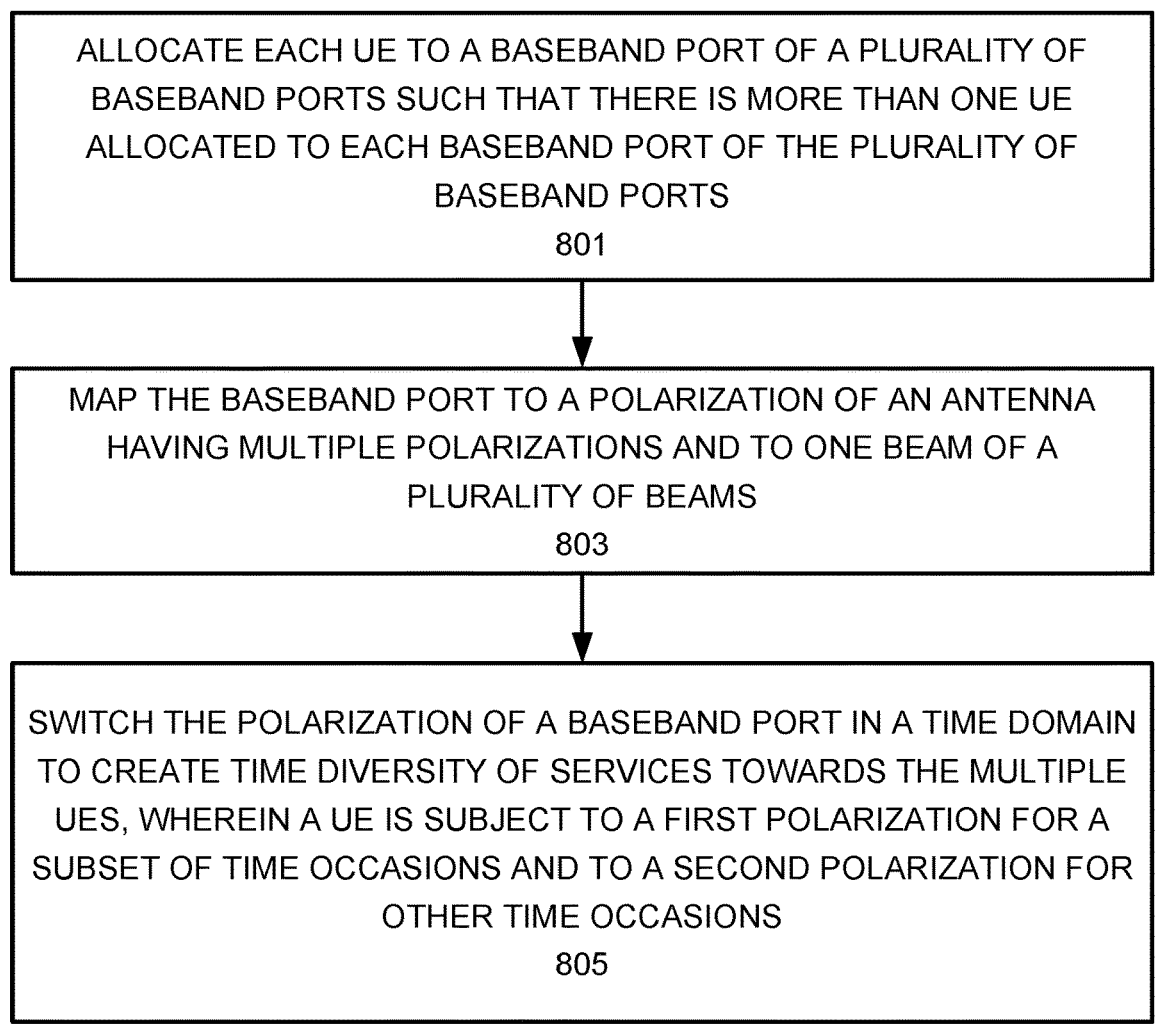

FIG. 8 illustrates various embodiments of switching the polarization of a baseband port. Turning to FIG. 8, in block 801, the processing circuitry 603 allocates each UE 500 to a baseband port (0, 1) of a plurality of baseband ports (0, 1) such that there is more than one UE 500 allocated to each baseband port (0, 1) of the plurality of baseband ports (0, 1).

In various embodiments of inventive concepts, the processing circuitry 603 allocates each UE to a baseband port of the plurality of baseband ports by allocating each UE to a baseband port in which the UE is located in a coverage area of a respective beam to which the baseband port is mapped.

In block 803, for each baseband port of the plurality of baseband ports, the processing circuitry 603 maps the baseband port to a polarization of an antenna having multiple polarizations and to one beam of a plurality of beams. In some embodiments of inventive concepts, the number of beams in the plurality of beams matches the number of polarizations in the multiple polarizations.

In block 805, for each baseband port of the plurality of baseband ports, the processing circuitry 603 switches the polarization of a baseband port in a time domain to create time diversity of services towards the multiple UEs, wherein a UE is subject to a first polarization for a subset of time occasions and to a second polarization for other time occasions.

In some embodiments, the processing circuitry 603 switches the polarization of the baseband port by switching a polarization of a baseband port associated with a downlink channel based on uplink sounding reference signal, SRS, detection results showing which polarization has a better channel quality for downlink.

In other embodiments, the processing circuitry 603 switches the polarization of the baseband port in the time domain by switching the polarization for hybrid automatic repeat request transmission, HARQ transmission, responsive to a failure of decoding of an initial HARQ transmission or a retransmitted HARQ transmission.

In some embodiments, the network node 600 instructs the UE 500 to estimate the channel after the switch in polarization. FIG. 9 illustrates one of these embodiments. Turning to FIG. 9, in block 901, the processing circuitry 603, responsive to there being a switch in polarization within a slot, provides a demodulation reference signal, DM-RS, for the UE 500 to estimate the channel in regard to upcoming symbols by performing channel estimation without any filtering.

In block 903, the processing circuitry 603 provides an indication to the UE 500 to enable or disable DM-RS filtering when performing measurements on the DM-RS.

In some embodiments, the processing circuitry 603 provides the indication by setting a parameter in a control resource set information element, IE, to indicate whether the DM-RS can be subject to filtering by the UE 500. In various of these embodiments, the processing circuitry 603 sets the parameter in the control resource set IE by setting a dmrs-NoFilteringWithinSlot parameter.

In some other embodiments, the processing circuitry 603 provides the indication by setting a parameter in a DMRS-downlink configuration information element, IE, to indicate whether the DM-RS can be subject to filtering by the UE.

In yet other embodiments, the processing circuitry 603 provides the indication by providing a DMRS No Filtering Within Slot Activation/Deactivation medium access control, MAC, control element, CE to indicate whether to activate or deactivate no filtering for DM-RS within a slot.

In further embodiments, the processing circuitry 603 provides the indication by providing a downlink control information, DCI, that indicates whether DM-RS no filtering is enabled.

Returning to FIG. 9, in block 905, the processing circuitry 603 dynamically schedules a physical downlink shared channel for which DM-RS filtering is enabled or disabled by the UE 500 based on the indication.

In various embodiments, the processing circuitry 603 performs filtering on an uplink channel responsive to determining to provide time diversity on the uplink channel.

In the description that follows, while the UE may be any of the UE 500, wireless device 1212A, 1212B, wired or wireless devices UE 1212C, UE 1212D, UE 1300, virtualization hardware 1604, virtual machines 1608A, 1608B, or UE 1706, the UE 500 shall be used to describe the functionality of the operations of the communication device.

Operations of the UE 500 (implemented using the structure of the block diagram of FIG. 5) will now be discussed with reference to the flow charts of FIGS. 10 and 11 according to some embodiments of inventive concepts. For example, modules may be stored in memory 505 of FIG. 5, and these modules may provide instructions so that when the instructions of a module are executed by respective UE processing circuitry 503, processing circuitry 503 performs respective operations of the flow charts.

FIG. 10 illustrates a method by the UE 500 in a network where a network node allocates at least two beams in a slot to schedule multiple user equipments, UEs.

Turning to FIG. 10, in block 1001, the processing circuitry 503 receives from a network an allocation of the UE 500 to a baseband port (0, 1) of a plurality of baseband ports (0, 1) where there is more than one UE 500 allocated to each baseband port (0, 1) of the plurality of baseband ports, each baseband port (0, 1) mapped to a polarization of an antenna having multiple polarizations and to one beam of a plurality of beams, wherein the UE 500 is subject to a first polarization for a subset of time occasions and to a second polarization for other time occasions.

In block 1003, the processing circuitry 503 receives an indication of whether or not to disable demodulation reference signal, DM-RS, filtering when performing measurements on a DM-RS. In some embodiments, the processing circuitry 503 receives the indication by obtaining a parameter in a control resource set information element, IE, to indicate whether the DM-RS can be subject to filtering by the UE 500. In some of these embodiments, the parameter in the control resource set IE is a dmrs-NoFilteringWithinSlot parameter.

In other embodiments, the processing circuitry 503 receives the indication by obtaining a parameter in a DMRS-downlink configuration information element, IE, to indicate whether the DM-RS can be subject to filtering by the UE 500.

If yet other embodiments, the processing circuitry 503 receives the indication by receiving a DMRS No Filtering Within Slot Activation/Deactivation medium access control, MAC, control element, CE to indicate whether to activate or deactivate no filtering for DM-RS within a slot.

In further embodiments, the processing circuitry 503 receives the indication by receiving a downlink control information, DCI, that indicates whether DM-RS no filtering is enabled.

In block 1005, the processing circuitry 503 performs measurements on the DM-RS based on the indication.

FIG. 11 illustrates an embodiment of dynamically scheduling the UE 500. Turning to FIG. 11, in block 1101, the processing circuitry 503 dynamically receives scheduling of a physical downlink shared channel for which DM-RS filtering is enabled or disabled by the UE 500 based on the indication.

Figure 12:
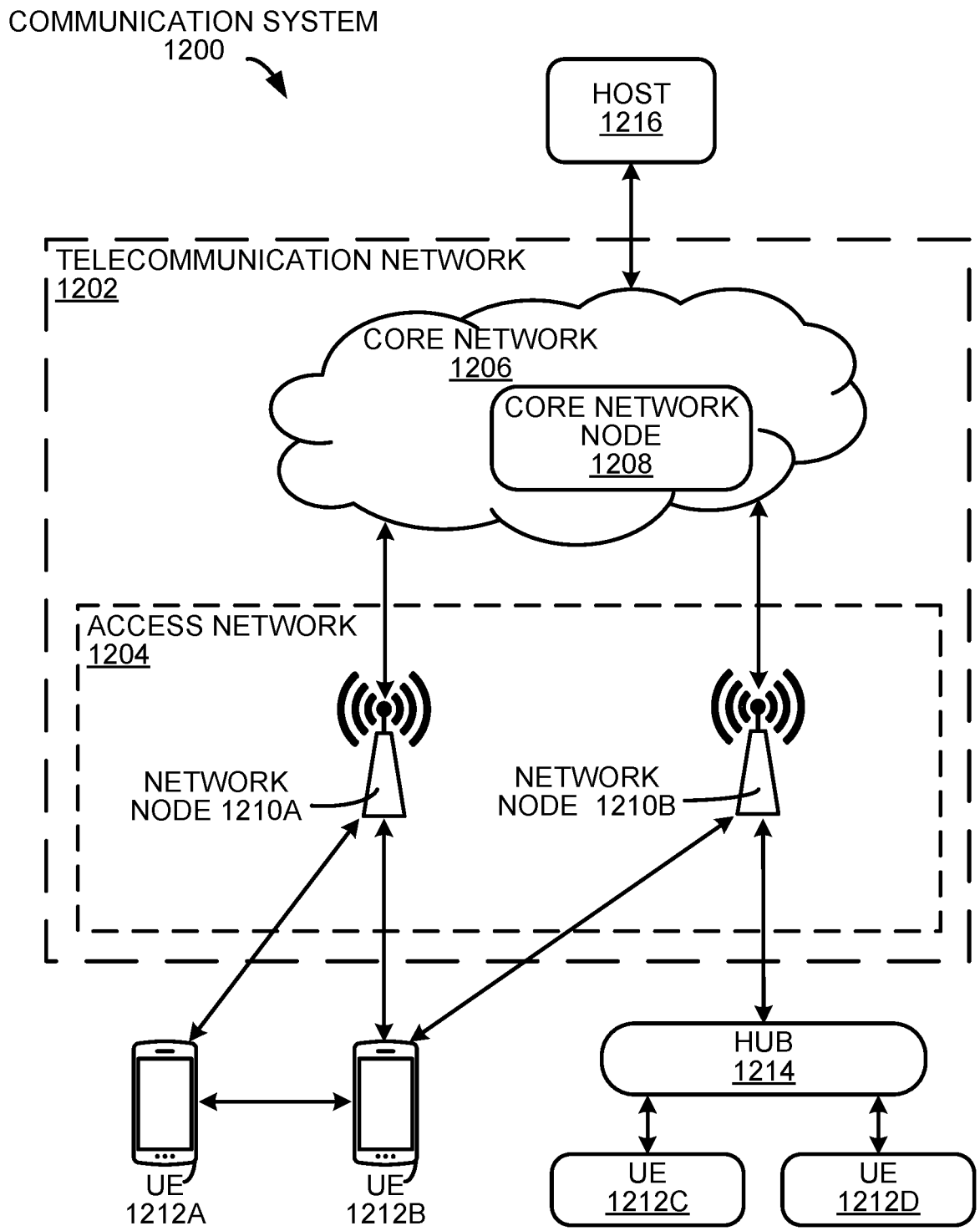
FIG. 12 is a block diagram of a communication system in accordance with some embodiments.

FIG. 12 shows an example of a communication system 1200 in accordance with some embodiments.

In the example, the communication system 1200 includes a telecommunication network 1202 that includes an access network 1204, such as a radio access network (RAN), and a core network 1206, which includes one or more core network nodes 1208. The access network 1204 includes one or more access network nodes, such as network nodes 1210A and 1210B (one or more of which may be generally referred to as network nodes 1210), or any other similar 3$^{rd}$ Generation Partnership Project (3GPP) access node or non-3GPP access point. The network nodes 1210 facilitate direct or indirect connection of user equipment (UE), such as by connecting UEs 1212A, 1212B, 1212C, and 1212D (one or more of which may be generally referred to as UEs 1212) to the core network 1206 over one or more wireless connections.

Example wireless communications over a wireless connection include transmitting and/or receiving wireless signals using electromagnetic waves, radio waves, infrared waves, and/or other types of signals suitable for conveying information without the use of wires, cables, or other material conductors. Moreover, in different embodiments, the communication system 1200 may include any number of wired or wireless networks, network nodes, UEs, and/or any other components or systems that may facilitate or participate in the communication of data and/or signals whether via wired or wireless connections. The communication system 1200 may include and/or interface with any type of communication, telecommunication, data, cellular, radio network, and/or other similar type of system.

The UEs 1212 may be any of a wide variety of communication devices, including wireless devices arranged, configured, and/or operable to communicate wirelessly with the network nodes 1210 and other communication devices. Similarly, the network nodes 1210 are arranged, capable, configured, and/or operable to communicate directly or indirectly with the UEs 1212 and/or with other network nodes or equipment in the telecommunication network 1202 to enable and/or provide network access, such as wireless network access, and/or to perform other functions, such as administration in the telecommunication network 1202.

In the depicted example, the core network 1206 connects the network nodes 1210 to one or more hosts, such as host 1216. These connections may be direct or indirect via one or more intermediary networks or devices. In other examples, network nodes may be directly coupled to hosts. The core network 1206 includes one more core network nodes (e.g., core network node 1208) that are structured with hardware and software components. Features of these components may be substantially similar to those described with respect to the UEs, network nodes, and/or hosts, such that the descriptions thereof are generally applicable to the corresponding components of the core network node 1208. Example core network nodes include functions of one or more of a Mobile Switching Center (MSC), Mobility Management Entity (MME), Home Subscriber Server (HSS), Access and Mobility Management Function (AMF), Session Management Function (SMF), Authentication Server Function (AUSF), Subscription Identifier De-concealing function (SIDF), Unified Data Management (UDM), Security Edge Protection Proxy (SEPP), Network Exposure Function (NEF), and/or a User Plane Function (UPF).

The host 1216 may be under the ownership or control of a service provider other than an operator or provider of the access network 1204 and/or the telecommunication network 1202, and may be operated by the service provider or on behalf of the service provider. The host 1216 may host a variety of applications to provide one or more service. Examples of such applications include live and pre-recorded audio/video content, data collection services such as retrieving and compiling data on various ambient conditions detected by a plurality of UEs, analytics functionality, social media, functions for controlling or otherwise interacting with remote devices, functions for an alarm and surveillance center, or any other such function performed by a server.

As a whole, the communication system 1200 of FIG. 12 enables connectivity between the UEs, network nodes, and hosts. In that sense, the communication system may be configured to operate according to predefined rules or procedures, such as specific standards that include, but are not limited to: Global System for Mobile Communications (GSM); Universal Mobile Telecommunications System (UMTS); Long Term Evolution (LTE), and/or other suitable 2G, 3G, 4G, 5G standards, or any applicable future generation standard (e.g., 6G); wireless local area network (WLAN) standards, such as the Institute of Electrical and Electronics Engineers (IEEE) 802.11 standards (WiFi); and/or any other appropriate wireless communication standard, such as the Worldwide Interoperability for Microwave Access (WiMax), Bluetooth, Z-Wave, Near Field Communication (NFC) ZigBee, LiFi (light fidelity), and/or any low-power wide-area network (LPWAN) standards such as LoRa and Sigfox.

In some examples, the telecommunication network 1202 is a cellular network that implements 3GPP standardized features. Accordingly, the telecommunications network 1202 may support network slicing to provide different logical networks to different devices that are connected to the telecommunication network 1202. For example, the telecommunications network 1202 may provide Ultra Reliable Low Latency Communication (URLLC) services to some UEs, while providing Enhanced Mobile Broadband (eMBB) services to other UEs, and/or Massive Machine Type Communication (mMTC)/Massive IoT services to yet further UEs.

In some examples, the UEs 1212 are configured to transmit and/or receive information without direct human interaction. For instance, a UE may be designed to transmit information to the access network 1204 on a predetermined schedule, when triggered by an internal or external event, or in response to requests from the access network 1204. Additionally, a UE may be configured for operating in single- or multi-RAT or multi-standard mode. For example, a UE may operate with any one or combination of Wi-Fi, NR (New Radio) and LTE, i.e. being configured for multi-radio dual connectivity (MR-DC), such as E-UTRAN (Evolved-UMTS Terrestrial Radio Access Network) New Radio-Dual Connectivity (EN-DC).

In the example, the hub 1214 communicates with the access network 1204 to facilitate indirect communication between one or more UEs (e.g., UE 1212C and/or 1212D) and network nodes (e.g., network node 1210B). In some examples, the hub 1214 may be a controller, router, content source and analytics, or any of the other communication devices described herein regarding UEs. For example, the hub 1214 may be a broadband router enabling access to the core network 1206 for the UEs. As another example, the hub 1214 may be a controller that sends commands or instructions to one or more actuators in the UEs. Commands or instructions may be received from the UEs, network nodes 1210, or by executable code, script, process, or other instructions in the hub 1214. As another example, the hub 1214 may be a data collector that acts as temporary storage for UE data and, in some embodiments, may perform analysis or other processing of the data. As another example, the hub 1214 may be a content source. For example, for a UE that is a VR headset, display, loudspeaker or other media delivery device, the hub 1214 may retrieve VR assets, video, audio, or other media or data related to sensory information via a network node, which the hub 1214 then provides to the UE either directly, after performing local processing, and/or after adding additional local content. In still another example, the hub 1214 acts as a proxy server or orchestrator for the UEs, in particular in if one or more of the UEs are low energy IoT devices.

The hub 1214 may have a constant/persistent or intermittent connection to the network node 1210B. The hub 1214 may also allow for a different communication scheme and/or schedule between the hub 1214 and UEs (e.g., UE 1212C and/or 1212D), and between the hub 1214 and the core network 1206. In other examples, the hub 1214 is connected to the core network 1206 and/or one or more UEs via a wired connection. Moreover, the hub 1214 may be configured to connect to an M2M service provider over the access network 1204 and/or to another UE over a direct connection. In some scenarios, UEs may establish a wireless connection with the network nodes 1210 while still connected via the hub 1214 via a wired or wireless connection. In some embodiments, the hub 1214 may be a dedicated hub—that is, a hub whose primary function is to route communications to/from the UEs from/to the network node 1210B. In other embodiments, the hub 1214 may be a non-dedicated hub—that is, a device which is capable of operating to route communications between the UEs and network node 1210B, but which is additionally capable of operating as a communication start and/or end point for certain data channels.

Figure 13:
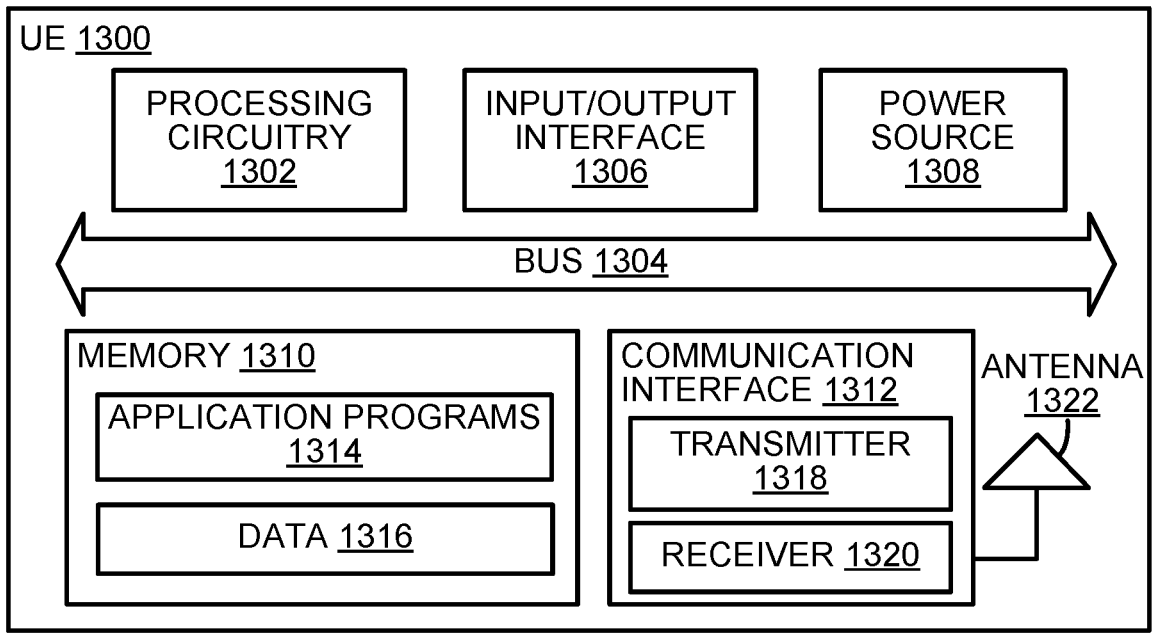
FIG. 13 is a block diagram of a user equipment in accordance with some embodiments

FIG. 13 shows a UE 1300 in accordance with some embodiments. As used herein, a UE refers to a device capable, configured, arranged and/or operable to communicate wirelessly with network nodes and/or other UEs. Examples of a UE include, but are not limited to, a smart phone, mobile phone, cell phone, voice over IP (VoIP) phone, wireless local loop phone, desktop computer, personal digital assistant (PDA), wireless cameras, gaming console or device, music storage device, playback appliance, wearable terminal device, wireless endpoint, mobile station, tablet, laptop, laptop-embedded equipment (LEE), laptop-mounted equipment (LME), smart device, wireless customer-premise equipment (CPE), vehicle-mounted or vehicle embedded/integrated wireless device, etc. Other examples include any UE identified by the 3rd Generation Partnership Project (3GPP), including a narrow band internet of things (NB-IoT) UE, a machine type communication (MTC) UE, and/or an enhanced MTC (eMTC) UE.

A UE may support device-to-device (D2D) communication, for example by implementing a 3GPP standard for sidelink communication, Dedicated Short-Range Communication (DSRC), vehicle-to-vehicle (V2V), vehicle-to-infrastructure (V2I), or vehicle-to-everything (V2X). In other examples, a UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter).

The UE 1300 includes processing circuitry 1302 that is operatively coupled via a bus 1304 to an input/output interface 1306, a power source 1308, a memory 1310, a communication interface 1312, and/or any other component, or any combination thereof. Certain UEs may utilize all or a subset of the components shown in FIG. 13. The level of integration between the components may vary from one UE to another UE. Further, certain UEs may contain multiple instances of a component, such as multiple processors, memories, transceivers, transmitters, receivers, etc.

The processing circuitry 1302 is configured to process instructions and data and may be configured to implement any sequential state machine operative to execute instructions stored as machine-readable computer programs in the memory 1310. The processing circuitry 1302 may be implemented as one or more hardware-implemented state machines (e.g., in discrete logic, field-programmable gate arrays (FPGAs), application specific integrated circuits (ASICs), etc.); programmable logic together with appropriate firmware; one or more stored computer programs, general-purpose processors, such as a microprocessor or digital signal processor (DSP), together with appropriate software; or any combination of the above. For example, the processing circuitry 1302 may include multiple central processing units (CPUs).

In the example, the input/output interface 1306 may be configured to provide an interface or interfaces to an input device, output device, or one or more input and/or output devices. Examples of an output device include a speaker, a sound card, a video card, a display, a monitor, a printer, an actuator, an emitter, a smartcard, another output device, or any combination thereof. An input device may allow a user to capture information into the UE 1300. Examples of an input device include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, a biometric sensor, etc., or any combination thereof. An output device may use the same type of interface port as an input device. For example, a Universal Serial Bus (USB) port may be used to provide an input device and an output device.

In some embodiments, the power source 1308 is structured as a battery or battery pack. Other types of power sources, such as an external power source (e.g., an electricity outlet), photovoltaic device, or power cell, may be used. The power source 1308 may further include power circuitry for delivering power from the power source 1308 itself, and/or an external power source, to the various parts of the UE 1300 via input circuitry or an interface such as an electrical power cable. Delivering power may be, for example, for charging of the power source 1308. Power circuitry may perform any formatting, converting, or other modification to the power from the power source 1308 to make the power suitable for the respective components of the UE 1300 to which power is supplied.

The memory 1310 may be or be configured to include memory such as random access memory (RAM), read-only memory (ROM), programmable read-only memory (PROM), erasable programmable read-only memory (EPROM), electrically erasable programmable read-only memory (EEPROM), magnetic disks, optical disks, hard disks, removable cartridges, flash drives, and so forth. In one example, the memory 1310 includes one or more application programs 1314, such as an operating system, web browser application, a widget, gadget engine, or other application, and corresponding data 1316. The memory 1310 may store, for use by the UE 1300, any of a variety of various operating systems or combinations of operating systems.

The memory 1310 may be configured to include a number of physical drive units, such as redundant array of independent disks (RAID), flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as tamper resistant module in the form of a universal integrated circuit card (UICC) including one or more subscriber identity modules (SIMs), such as a USIM and/or ISIM, other memory, or any combination thereof. The UICC may for example be an embedded UICC (eUICC), integrated UICC (iUICC) or a removable UICC commonly known as 'SIM card.' The memory 1310 may allow the UE 1300 to access instructions, application programs and the like, stored on transitory or non-transitory memory media, to off-load data, or to upload data. An article of manufacture, such as one utilizing a communication system may be tangibly embodied as or in the memory 1310, which may be or comprise a device-readable storage medium.

The processing circuitry 1302 may be configured to communicate with an access network or other network using the communication interface 1312. The communication interface 1312 may comprise one or more communication subsystems and may include or be communicatively coupled to an antenna 1322. The communication interface 1312 may include one or more transceivers used to communicate, such as by communicating with one or more remote transceivers of another device capable of wireless communication (e.g., another UE or a network node in an access network). Each transceiver may include a transmitter 1318 and/or a receiver 1320 appropriate to provide network communications (e.g., optical, electrical, frequency allocations, and so forth). Moreover, the transmitter 1318 and receiver 1320 may be coupled to one or more antennas (e.g., antenna 1322) and may share circuit components, software or firmware, or alternatively be implemented separately.

In the illustrated embodiment, communication functions of the communication interface 1312 may include cellular communication, Wi-Fi communication, LPWAN communication, data communication, voice communication, multimedia communication, short-range communications such as Bluetooth, near-field communication, location-based communication such as the use of the global positioning system (GPS) to determine a location, another like communication function, or any combination thereof. Communications may be implemented in according to one or more communication protocols and/or standards, such as IEEE 802.11, Code Division Multiplexing Access (CDMA), Wideband Code Division Multiple Access (WCDMA), GSM, LTE, New Radio (NR), UMTS, WiMax, Ethernet, transmission control protocol/internet protocol (TCP/IP), synchronous optical networking (SONET), Asynchronous Transfer Mode (ATM), QUIC, Hypertext Transfer Protocol (HTTP), and so forth.

Regardless of the type of sensor, a UE may provide an output of data captured by its sensors, through its communication interface 1312, via a wireless connection to a network node. Data captured by sensors of a UE can be communicated through a wireless connection to a network node via another UE. The output may be periodic (e.g., once every 15 minutes if it reports the sensed temperature), random (e.g., to even out the load from reporting from several sensors), in response to a triggering event (e.g., when moisture is detected an alert is sent), in response to a request (e.g., a user initiated request), or a continuous stream (e.g., a live video feed of a patient).

As another example, a UE comprises an actuator, a motor, or a switch, related to a communication interface configured to receive wireless input from a network node via a wireless connection. In response to the received wireless input the states of the actuator, the motor, or the switch may change. For example, the UE may comprise a motor that adjusts the control surfaces or rotors of a drone in flight according to the received input or to a robotic arm performing a medical procedure according to the received input.

A UE, when in the form of an Internet of Things (IoT) device, may be a device for use in one or more application domains, these domains comprising, but not limited to, city wearable technology, extended industrial application and healthcare. Non-limiting examples of such an IoT device are a device which is or which is embedded in: a connected refrigerator or freezer, a TV, a connected lighting device, an electricity meter, a robot vacuum cleaner, a voice controlled smart speaker, a home security camera, a motion detector, a thermostat, a smoke detector, a door/window sensor, a flood/moisture sensor, an electrical door lock, a connected doorbell, an air conditioning system like a heat pump, an autonomous vehicle, a surveillance system, a weather monitoring device, a vehicle parking monitoring device, an electric vehicle charging station, a smart watch, a fitness tracker, a head-mounted display for Augmented Reality (AR) or Virtual Reality (VR), a wearable for tactile augmentation or sensory enhancement, a water sprinkler, an animal- or item-tracking device, a sensor for monitoring a plant or animal, an industrial robot, an Unmanned Aerial Vehicle (UAV), and any kind of medical device, like a heart rate monitor or a remote controlled surgical robot. A UE in the form of an IoT device comprises circuitry and/or software in dependence of the intended application of the IoT device in addition to other components as described in relation to the UE 1300 shown in FIG. 13.

As yet another specific example, in an IoT scenario, a UE may represent a machine or other device that performs monitoring and/or measurements, and transmits the results of such monitoring and/or measurements to another UE and/or a network node. The UE may in this case be an M2M device, which may in a 3GPP context be referred to as an MTC device. As one particular example, the UE may implement the 3GPP NB-IoT standard. In other scenarios, a UE may represent a vehicle, such as a car, a bus, a truck, a ship and an airplane, or other equipment that is capable of monitoring and/or reporting on its operational status or other functions associated with its operation.

In practice, any number of UEs may be used together with respect to a single use case. For example, a first UE might be or be integrated in a drone and provide the drone's speed information (obtained through a speed sensor) to a second UE that is a remote controller operating the drone. When the user makes changes from the remote controller, the first UE may adjust the throttle on the drone (e.g. by controlling an actuator) to increase or decrease the drone's speed. The first and/or the second UE can also include more than one of the functionalities described above. For example, a UE might comprise the sensor and the actuator, and handle communication of data for both the speed sensor and the actuators.

Figure 14:
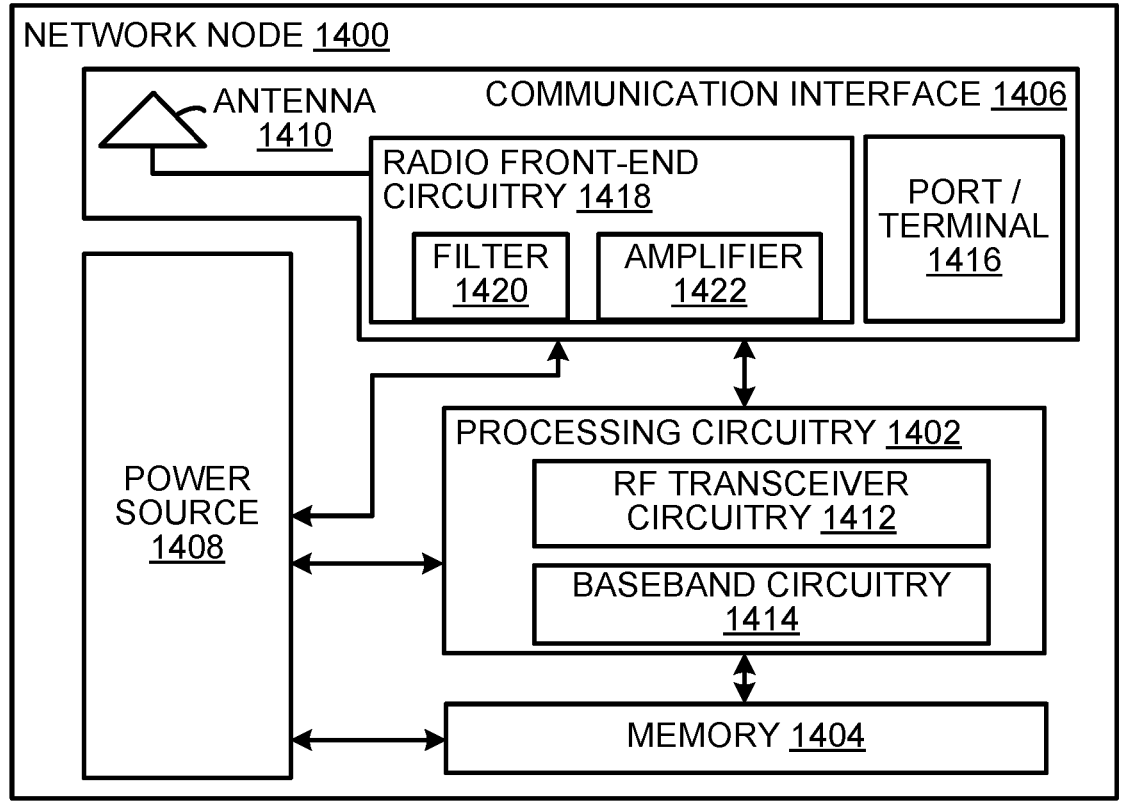
FIG. 14 is a block diagram of a network node in accordance with some embodiments.

FIG. 14 shows a network node 1400 in accordance with some embodiments. As used herein, network node refers to equipment capable, configured, arranged and/or operable to communicate directly or indirectly with a UE and/or with other network nodes or equipment, in a telecommunication network. Examples of network nodes include, but are not limited to, access points (APs) (e.g., radio access points), base stations (BSs) (e.g., radio base stations, Node Bs, evolved Node Bs (eNBs) and NR NodeBs (gNBs)).

Base stations may be categorized based on the amount of coverage they provide (or, stated differently, their transmit power level) and so, depending on the provided amount of coverage, may be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS).

Other examples of network nodes include multiple transmission point (multi-TRP) 5G access nodes, multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), Operation and Maintenance (O&M) nodes, Operations Support System (OSS) nodes, Self-Organizing Network (SON) nodes, positioning nodes (e.g., Evolved Serving Mobile Location Centers (E-SMLCs)), and/or Minimization of Drive Tests (MDTs).

The network node 1400 includes a processing circuitry 1402, a memory 1404, a communication interface 1406, and a power source 1408. The network node 1400 may be composed of multiple physically separate components (e.g., a NodeB component and a RNC component, or a BTS component and a BSC component, etc.), which may each have their own respective components. In certain scenarios in which the network node 1400 comprises multiple separate components (e.g., BTS and BSC components), one or more of the separate components may be shared among several network nodes. For example, a single RNC may control multiple NodeBs. In such a scenario, each unique NodeB and RNC pair, may in some instances be considered a single separate network node. In some embodiments, the network node 1400 may be configured to support multiple radio access technologies (RATs). In such embodiments, some components may be duplicated (e.g., separate memory 1404 for different RATs) and some components may be reused (e.g., a same antenna 1410 may be shared by different RATs). The network node 1400 may also include multiple sets of the various illustrated components for different wireless technologies integrated into network node 1400, for example GSM, WCDMA, LTE, NR, WiFi, Zigbee, Z-wave, LoRaWAN, Radio Frequency Identification (RFID) or Bluetooth wireless technologies. These wireless technologies may be integrated into the same or different chip or set of chips and other components within network node 1400.

The processing circuitry 1402 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 1400 components, such as the memory 1404, to provide network node 1400 functionality.

In some embodiments, the processing circuitry 1402 includes a system on a chip (SOC). In some embodiments, the processing circuitry 1402 includes one or more of radio frequency (RF) transceiver circuitry 1412 and baseband processing circuitry 1414. In some embodiments, the radio frequency (RF) transceiver circuitry 1412 and the baseband processing circuitry 1414 may be on separate chips (or sets of chips), boards, or units, such as radio units and digital units. In alternative embodiments, part or all of RF transceiver circuitry 1412 and baseband processing circuitry 1414 may be on the same chip or set of chips, boards, or units.

The memory 1404 may comprise any form of volatile or non-volatile computer-readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device-readable and/or computer-executable memory devices that store information, data, and/or instructions that may be used by the processing circuitry 1402. The memory 1404 may store any suitable instructions, data, or information, including a computer program, software, an application including one or more of logic, rules, code, tables, and/or other instructions capable of being executed by the processing circuitry 1402 and utilized by the network node 1400. The memory 1404 may be used to store any calculations made by the processing circuitry 1402 and/or any data received via the communication interface 1406. In some embodiments, the processing circuitry 1402 and memory 1404 is integrated.

The communication interface 1406 is used in wired or wireless communication of signaling and/or data between a network node, access network, and/or UE. As illustrated, the communication interface 1406 comprises port(s)/terminal(s) 1416 to send and receive data, for example to and from a network over a wired connection. The communication interface 1406 also includes radio front-end circuitry 1418 that may be coupled to, or in certain embodiments a part of, the antenna 1410. Radio front-end circuitry 1418 comprises filters 1420 and amplifiers 1422. The radio front-end circuitry 1418 may be connected to an antenna 1410 and processing circuitry 1402. The radio front-end circuitry may be configured to condition signals communicated between antenna 1410 and processing circuitry 1402. The radio front-end circuitry 1418 may receive digital data that is to be sent out to other network nodes or UEs via a wireless connection. The radio front-end circuitry 1418 may convert the digital data into a radio signal having the appropriate channel and bandwidth parameters using a combination of filters 1420 and/or amplifiers 1422. The radio signal may then be transmitted via the antenna 1410. Similarly, when receiving data, the antenna 1410 may collect radio signals which are then converted into digital data by the radio front-end circuitry 1418. The digital data may be passed to the processing circuitry 1402. In other embodiments, the communication interface may comprise different components and/or different combinations of components.

In certain alternative embodiments, the network node 1400 does not include separate radio front-end circuitry 1418, instead, the processing circuitry 1402 includes radio front-end circuitry and is connected to the antenna 1410. Similarly, in some embodiments, all or some of the RF transceiver circuitry 1412 is part of the communication interface 1406. In still other embodiments, the communication interface 1406 includes one or more ports or terminals 1416, the radio front-end circuitry 1418, and the RF transceiver circuitry 1412, as part of a radio unit (not shown), and the communication interface 1406 communicates with the baseband processing circuitry 1414, which is part of a digital unit (not shown).

The antenna 1410 may include one or more antennas, or antenna arrays, configured to send and/or receive wireless signals. The antenna 1410 may be coupled to the radio front-end circuitry 1418 and may be any type of antenna capable of transmitting and receiving data and/or signals wirelessly. In certain embodiments, the antenna 1410 is separate from the network node 1400 and connectable to the network node 1400 through an interface or port.

The antenna 1410, communication interface 1406, and/or the processing circuitry 1402 may be configured to perform any receiving operations and/or certain obtaining operations described herein as being performed by the network node. Any information, data and/or signals may be received from a UE, another network node and/or any other network equipment. Similarly, the antenna 1410, the communication interface 1406, and/or the processing circuitry 1402 may be configured to perform any transmitting operations described herein as being performed by the network node. Any information, data and/or signals may be transmitted to a UE, another network node and/or any other network equipment.

The power source 1408 provides power to the various components of network node 1400 in a form suitable for the respective components (e.g., at a voltage and current level needed for each respective component). The power source 1408 may further comprise, or be coupled to, power management circuitry to supply the components of the network node 1400 with power for performing the functionality described herein. For example, the network node 1400 may be connectable to an external power source (e.g., the power grid, an electricity outlet) via an input circuitry or interface such as an electrical cable, whereby the external power source supplies power to power circuitry of the power source 1408. As a further example, the power source 1408 may comprise a source of power in the form of a battery or battery pack which is connected to, or integrated in, power circuitry. The battery may provide backup power should the external power source fail.

Embodiments of the network node 1400 may include additional components beyond those shown in FIG. 14 for providing certain aspects of the network node's functionality, including any of the functionality described herein and/or any functionality necessary to support the subject matter described herein. For example, the network node 1400 may include user interface equipment to allow input of information into the network node 1400 and to allow output of information from the network node 1400. This may allow a user to perform diagnostic, maintenance, repair, and other administrative functions for the network node 1400.

Figure 15:
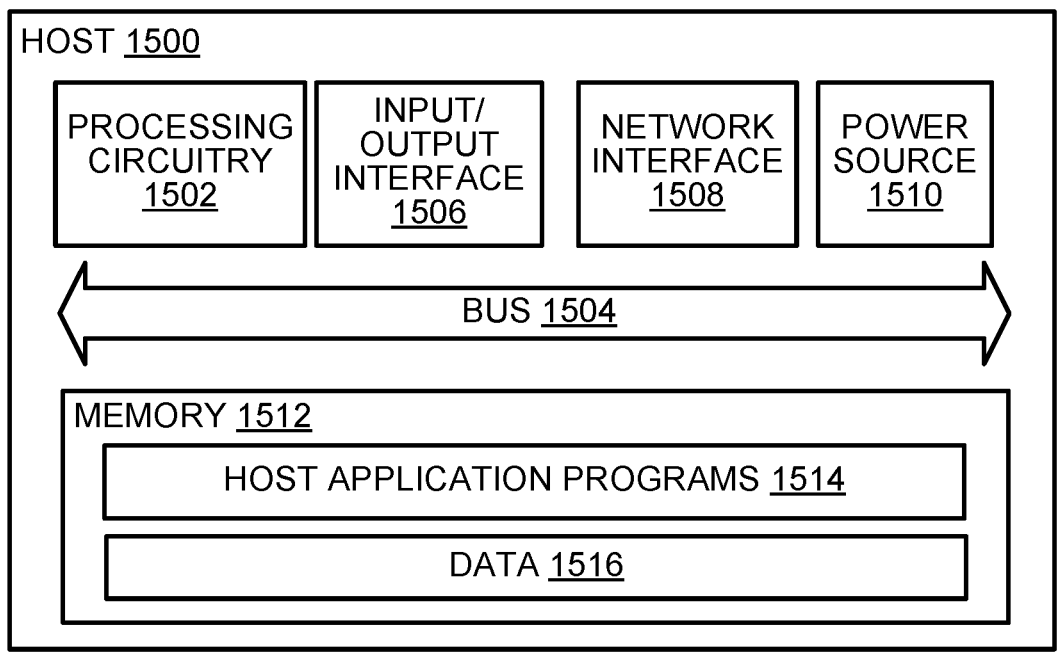
FIG. 15 is a block diagram of a host computer communicating with a user equipment in accordance with some embodiments.

FIG. 15 is a block diagram of a host 1500, which may be an embodiment of the host 1216 of FIG. 12, in accordance with various aspects described herein. As used herein, the host 1500 may be or comprise various combinations hardware and/or software, including a standalone server, a blade server, a cloud-implemented server, a distributed server, a virtual machine, container, or processing resources in a server farm. The host 1500 may provide one or more services to one or more UEs.

The host 1500 includes processing circuitry 1502 that is operatively coupled via a bus 1504 to an input/output interface 1506, a network interface 1508, a power source 1510, and a memory 1512. Other components may be included in other embodiments. Features of these components may be substantially similar to those described with respect to the devices of previous figures, such as FIGS. 13 and 14, such that the descriptions thereof are generally applicable to the corresponding components of host 1500.

The memory 1512 may include one or more computer programs including one or more host application programs 1514 and data 1516, which may include user data, e.g., data generated by a UE for the host 1500 or data generated by the host 1500 for a UE. Embodiments of the host 1500 may utilize only a subset or all of the components shown. The host application programs 1514 may be implemented in a container-based architecture and may provide support for video codecs (e.g., Versatile Video Coding (VVC), High Efficiency Video Coding (HEVC), Advanced Video Coding (AVC), MPEG, VP9) and audio codecs (e.g., FLAC, Advanced Audio Coding (AAC), MPEG, G.711), including transcoding for multiple different classes, types, or implementations of UEs (e.g., handsets, desktop computers, wearable display systems, heads-up display systems). The host application programs 1514 may also provide for user authentication and licensing checks and may periodically report health, routes, and content availability to a central node, such as a device in or on the edge of a core network. Accordingly, the host 1500 may select and/or indicate a different host for over-the-top services for a UE. The host application programs 1514 may support various protocols, such as the HTTP Live Streaming (HLS) protocol, Real-Time Messaging Protocol (RTMP), Real-Time Streaming Protocol (RTSP), Dynamic Adaptive Streaming over HTTP (MPEG-DASH), etc.

Figure 16:
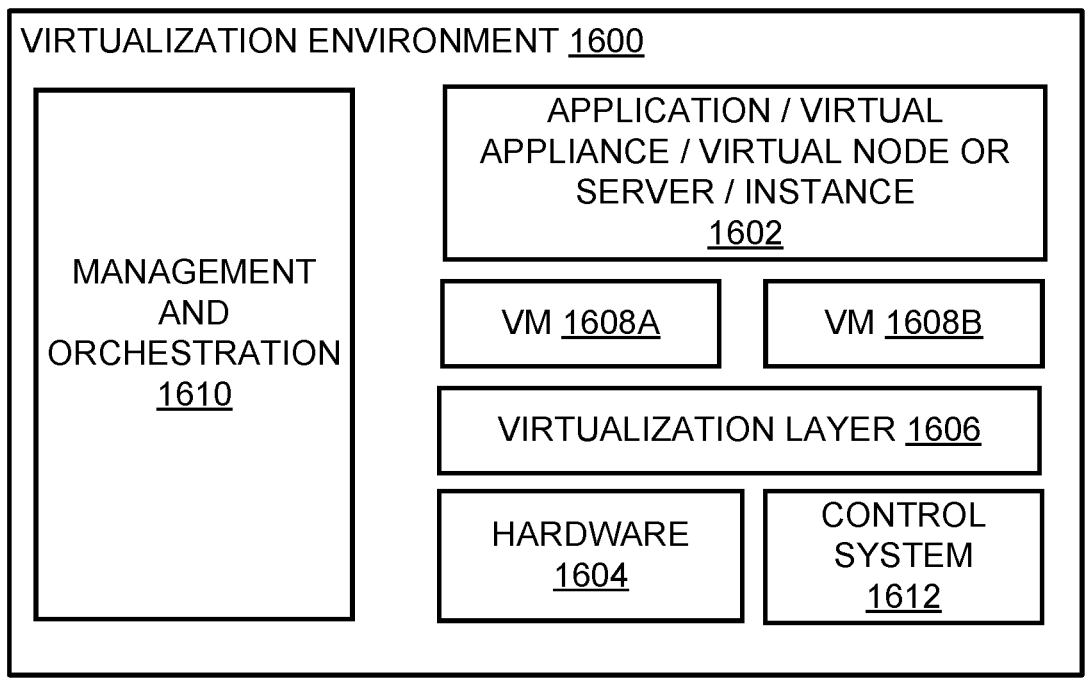
FIG. 16 is a block diagram of a virtualization environment in accordance with some embodiments.

FIG. 16 is a block diagram illustrating a virtualization environment 1600 in which functions implemented by some embodiments may be virtualized. In the present context, virtualizing means creating virtual versions of apparatuses or devices which may include virtualizing hardware platforms, storage devices and networking resources. As used herein, virtualization can be applied to any device described herein, or components thereof, and relates to an implementation in which at least a portion of the functionality is implemented as one or more virtual components. Some or all of the functions described herein may be implemented as virtual components executed by one or more virtual machines (VMs) implemented in one or more virtual environments 1600 hosted by one or more of hardware nodes, such as a hardware computing device that operates as a network node, UE, core network node, or host. Further, in embodiments in which the virtual node does not require radio connectivity (e.g., a core network node or host), then the node may be entirely virtualized.

Applications 1602 (which may alternatively be called software instances, virtual appliances, network functions, virtual nodes, virtual network functions, etc.) are run in the virtualization environment 1600 to implement some of the features, functions, and/or benefits of some of the embodiments disclosed herein.

Hardware 1604 includes processing circuitry, memory that stores software and/or instructions executable by hardware processing circuitry, and/or other hardware devices as described herein, such as a network interface, input/output interface, and so forth. Software may be executed by the processing circuitry to instantiate one or more virtualization layers 1606 (also referred to as hypervisors or virtual machine monitors (VMMs)), provide VMs 1608A and 1608B (one or more of which may be generally referred to as VMs 1608), and/or perform any of the functions, features and/or benefits described in relation with some embodiments described herein. The virtualization layer 1606 may present a virtual operating platform that appears like networking hardware to the VMs 1608.

The VMs 1608 comprise virtual processing, virtual memory, virtual networking or interface and virtual storage, and may be run by a corresponding virtualization layer 1606. Different embodiments of the instance of a virtual appliance 1602 may be implemented on one or more of VMs 1608, and the implementations may be made in different ways. Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, a VM 1608 may be a software implementation of a physical machine that runs programs as if they were executing on a physical, non-virtualized machine. Each of the VMs 1608, and that part of hardware 1604 that executes that VM, be it hardware dedicated to that VM and/or hardware shared by that VM with others of the VMs, forms separate virtual network elements. Still in the context of NFV, a virtual network function is responsible for handling specific network functions that run in one or more VMs 1608 on top of the hardware 1604 and corresponds to the application 1602.

Hardware 1604 may be implemented in a standalone network node with generic or specific components. Hardware 1604 may implement some functions via virtualization. Alternatively, hardware 1604 may be part of a larger cluster of hardware (e.g. such as in a data center or CPE) where many hardware nodes work together and are managed via management and orchestration 1610, which, among others, oversees lifecycle management of applications 1602. In some embodiments, hardware 1604 is coupled to one or more radio units that each include one or more transmitters and one or more receivers that may be coupled to one or more antennas. Radio units may communicate directly with other hardware nodes via one or more appropriate network interfaces and may be used in combination with the virtual components to provide a virtual node with radio capabilities, such as a radio access node or a base station. In some embodiments, some signaling can be provided with the use of a control system 1612 which may alternatively be used for communication between hardware nodes and radio units.

Figure 17:
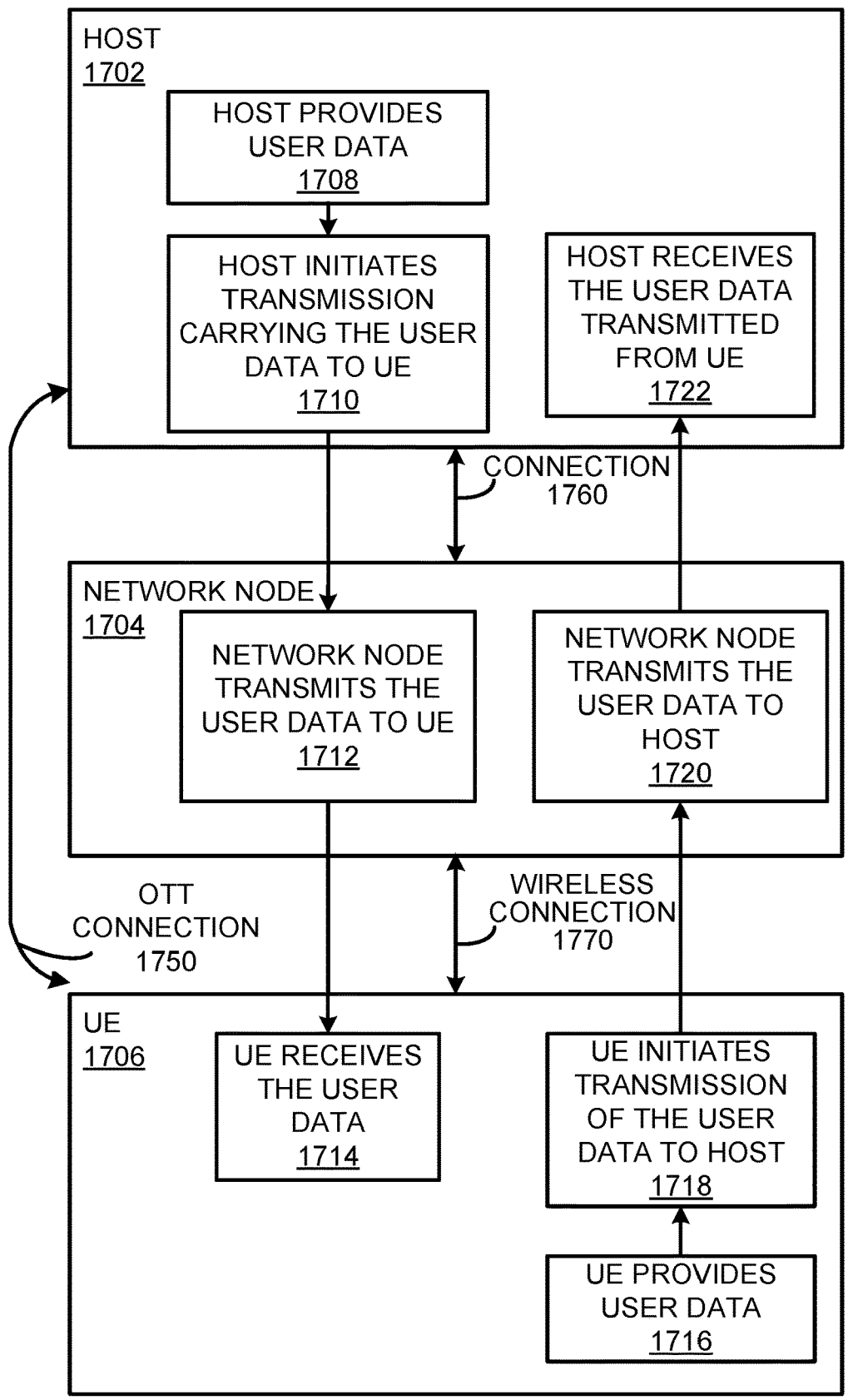
FIG. 17 is a block diagram of a host computer communicating via a base station with a user equipment over a partially wireless connection in accordance with some embodiments.

FIG. 17 shows a communication diagram of a host 1702 communicating via a network node 1704 with a UE 1706 over a partially wireless connection in accordance with some embodiments. Example implementations, in accordance with various embodiments, of the UE (such as a UE 1212A of FIG. 12 and/or UE 1300 of FIG. 13), network node (such as network node 1210A of FIG. 12 and/or network node 1400 of FIG. 14), and host (such as host 1216 of FIG. 12 and/or host 1500 of FIG. 15) discussed in the preceding paragraphs will now be described with reference to FIG. 17.

Like host 1500, embodiments of host 1702 include hardware, such as a communication interface, processing circuitry, and memory. The host 1702 also includes software, which is stored in or accessible by the host 1702 and executable by the processing circuitry. The software includes a host application that may be operable to provide a service to a remote user, such as the UE 1706 connecting via an over-the-top (OTT) connection 1750 extending between the UE 1706 and host 1702. In providing the service to the remote user, a host application may provide user data which is transmitted using the OTT connection 1750.

The network node 1704 includes hardware enabling it to communicate with the host 1702 and UE 1706. The connection 1760 may be direct or pass through a core network (like core network 1206 of FIG. 12) and/or one or more other intermediate networks, such as one or more public, private, or hosted networks. For example, an intermediate network may be a backbone network or the Internet.

The UE 1706 includes hardware and software, which is stored in or accessible by UE 1706 and executable by the UE's processing circuitry. The software includes a client application, such as a web browser or operator-specific "app" that may be operable to provide a service to a human or non-human user via UE 1706 with the support of the host 1702. In the host 1702, an executing host application may communicate with the executing client application via the OTT connection 1750 terminating at the UE 1706 and host 1702. In providing the service to the user, the UE's client application may receive request data from the host's host application and provide user data in response to the request data. The OTT connection 1750 may transfer both the request data and the user data. The UE's client application may interact with the user to generate the user data that it provides to the host application through the OTT connection 1750.

The OTT connection 1750 may extend via a connection 1760 between the host 1702 and the network node 1704 and via a wireless connection 1770 between the network node 1704 and the UE 1706 to provide the connection between the host 1702 and the UE 1706. The connection 1760 and wireless connection 1770, over which the OTT connection 1750 may be provided, have been drawn abstractly to illustrate the communication between the host 1702 and the UE 1706 via the network node 1704, without explicit reference to any intermediary devices and the precise routing of messages via these devices.

As an example of transmitting data via the OTT connection 1750, in step 1708, the host 1702 provides user data, which may be performed by executing a host application. In some embodiments, the user data is associated with a particular human user interacting with the UE 1706. In other embodiments, the user data is associated with a UE 1706 that shares data with the host 1702 without explicit human interaction. In step 1710, the host 1702 initiates a transmission carrying the user data towards the UE 1706. The host 1702 may initiate the transmission responsive to a request transmitted by the UE 1706. The request may be caused by human interaction with the UE 1706 or by operation of the client application executing on the UE 1706. The transmission may pass via the network node 1704, in accordance with the teachings of the embodiments described throughout this disclosure. Accordingly, in step 1712, the network node 1704 transmits to the UE 1706 the user data that was carried in the transmission that the host 1702 initiated, in accordance with the teachings of the embodiments described throughout this disclosure. In step 1714, the UE 1706 receives the user data carried in the transmission, which may be performed by a client application executed on the UE 1706 associated with the host application executed by the host 1702.

In some examples, the UE 1706 executes a client application which provides user data to the host 1702. The user data may be provided in reaction or response to the data received from the host 1702. Accordingly, in step 1716, the UE 1706 may provide user data, which may be performed by executing the client application. In providing the user data, the client application may further consider user input received from the user via an input/output interface of the UE 1706. Regardless of the specific manner in which the user data was provided, the UE 1706 initiates, in step 1718, transmission of the user data towards the host 1702 via the network node 1704. In step 1720, in accordance with the teachings of the embodiments described throughout this disclosure, the network node 1704 receives user data from the UE 1706 and initiates transmission of the received user data towards the host 1702. In step 1722, the host 1702 receives the user data carried in the transmission initiated by the UE 1706.

In an example scenario, factory status information may be collected and analyzed by the host 1702. As another example, the host 1702 may process audio and video data which may have been retrieved from a UE for use in creating maps. As another example, the host 1702 may collect and analyze real-time data to assist in controlling vehicle congestion (e.g., controlling traffic lights). As another example, the host 1702 may store surveillance video uploaded by a UE. As another example, the host 1702 may store or control access to media content such as video, audio, VR or AR which it can broadcast, multicast or unicast to UEs. As other examples, the host 1702 may be used for energy pricing, remote control of non-time critical electrical load to balance power generation needs, location services, presentation services (such as compiling diagrams etc. from data collected from remote devices), or any other function of collecting, retrieving, storing, analyzing and/or transmitting data.

In some examples, a measurement procedure may be provided for the purpose of monitoring data rate, latency and other factors on which the one or more embodiments improve. There may further be an optional network functionality for reconfiguring the OTT connection 1750 between the host 1702 and UE 1706, in response to variations in the measurement results. The measurement procedure and/or the network functionality for reconfiguring the OTT connection may be implemented in software and hardware of the host 1702 and/or UE 1706. In some embodiments, sensors (not shown) may be deployed in or in association with other devices through which the OTT connection 1750 passes; the sensors may participate in the measurement procedure by supplying values of the monitored quantities exemplified above, or supplying values of other physical quantities from which software may compute or estimate the monitored quantities. The reconfiguring of the OTT connection 1750 may include message format, retransmission settings, preferred routing etc.; the reconfiguring need not directly alter the operation of the network node 1704. Such procedures and functionalities may be known and practiced in the art. In certain embodiments, measurements may involve proprietary UE signaling that facilitates measurements of throughput, propagation times, latency and the like, by the host 1702. The measurements may be implemented in that software causes messages to be transmitted, in particular empty or 'dummy' messages, using the OTT connection 1750 while monitoring propagation times, errors, etc.

Although the computing devices described herein (e.g., UEs, network nodes, hosts) may include the illustrated combination of hardware components, other embodiments may comprise computing devices with different combinations of components. It is to be understood that these computing devices may comprise any suitable combination of hardware and/or software needed to perform the tasks, features, functions and methods disclosed herein. Determining, calculating, obtaining or similar operations described herein may be performed by processing circuitry, which may process information by, for example, converting the obtained information into other information, comparing the obtained information or converted information to information stored in the network node, and/or performing one or more operations based on the obtained information or converted information, and as a result of said processing making a determination. Moreover, while components are depicted as single boxes located within a larger box, or nested within multiple boxes, in practice, computing devices may comprise multiple different physical components that make up a single illustrated component, and functionality may be partitioned between separate components. For example, a communication interface may be configured to include any of the components described herein, and/or the functionality of the components may be partitioned between the processing circuitry and the communication interface. In another example, non-computationally intensive functions of any of such components may be implemented in software or firmware and computationally intensive functions may be implemented in hardware.

In certain embodiments, some or all of the functionality described herein may be provided by processing circuitry executing instructions stored on in memory, which in certain embodiments may be a computer program product in the form of a non-transitory computer-readable storage medium. In alternative embodiments, some or all of the functionality may be provided by the processing circuitry without executing instructions stored on a separate or discrete device-readable storage medium, such as in a hard-wired manner. In any of those particular embodiments, whether executing instructions stored on a non-transitory computer-readable storage medium or not, the processing circuitry can be configured to perform the described functionality. The benefits provided by such functionality are not limited to the processing circuitry alone or to other components of the computing device, but are enjoyed by the computing device as a whole, and/or by end users and a wireless network generally.

Further definitions and embodiments are discussed below.

In the above-description of various embodiments of present inventive concepts, it is to be understood that the terminology used herein is for the purpose of describing particular embodiments only and is not intended to be limiting of present inventive concepts. Unless otherwise defined, all terms (including technical and scientific terms) used herein have the same meaning as commonly understood by one of ordinary skill in the art to which present inventive concepts belong. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" (abbreviated "/") includes any and all combinations of one or more of the associated listed items.

It will be understood that although the terms first, second, third, etc. may be used herein to describe various elements/operations, these elements/operations should not be limited by these terms. These terms are only used to distinguish one element/operation from another element/operation. Thus a first element/operation in some embodiments could be termed a second element/operation in other embodiments without departing from the teachings of present inventive concepts. The same reference numerals or the same reference designators denote the same or similar elements throughout the specification.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, embodiments of present inventive concepts may be embodied in hardware and/or in software (including firmware, resident software, microcode, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts. Moreover, although some of the diagrams include arrows on communication paths to show a primary direction of communication, it is to be understood that communication may occur in the opposite direction to the depicted arrows.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the examples of embodiments are intended to cover all such modifications, enhancements, and other embodiments, which fall within the spirit and scope of present inventive concepts. Thus, to the maximum extent allowed by law, the scope of present inventive concepts is to be determined by the broadest permissible interpretation of the present disclosure including the examples of embodiments and their equivalents, and shall not be restricted or limited by the foregoing detailed description.

Explanations are provided below for various abbreviations/acronyms used in the present disclosure.

| Abbreviation | Explanation |
| --- | --- |
| AAS | Advanced Antenna Systems |
| CE | Control Element |
| CQI | Channel Quality Indicator |
| CSI | Channel State Information |
| CSI-RS | CSI- Reference Signal |
| DM-RS | Demodulation Reference Signal |
| FWA | Fixed Wireless Access |
| gNB | 5G Node B |
| HARQ | Hybrid Automatic Repeat Request |
| MAC | Medium Access Control |
| MIMO | Multiple-Input, Multiple-Output |
| MU-MIMO | Multi-User - MIMO |
| NR | New Radio |
| PDSCH | Physical Downlink Shared Channel |
| PMI | Precoding Matrix Indicator |
| PRB | Physical Resource Block |
| PRG | Precoder Resource Group |
| PUSCH | Physical Uplink Shared Channel |
| RI | Rank Indicator |
| SINR | Signal to Interference and Noise Ratio |
| SRS | Sounding Reference Signal |
| SU-MIMO | Single User - MIMO |
| UE | User Equipment |

The invention claimed is:

1. A method by a network node to allocate two beams in a slot to schedule multiple user equipments, UEs, the method comprising:
   allocating each UE to a baseband port of a plurality of baseband ports such that there is more than one UE allocated to each baseband port of the plurality of baseband ports; and
   for each baseband port of the plurality of baseband ports:
      mapping the baseband port to a polarization of an antenna having multiple polarizations and to one beam of a plurality of beams, wherein a number of the plurality of beams matches a number of the multiple polarizations; and
      switching the polarization of a baseband port in a time domain to create time diversity of services towards the multiple UEs, wherein a UE is subject to a first polarization for a subset of time occasions and to a second polarization for other time occasions.

2. The method of claim 1, wherein allocating each UE to a baseband port of the plurality of baseband ports comprises allocating each UE to a baseband port in which the UE is located in a coverage area of a respective beam to which the baseband port is mapped.

3. The method of claim 1, further comprising:
   responsive to there being a switch in polarization within a slot, providing a demodulation reference signal, DM-RS, for the UE to estimate the channel in regard to upcoming symbols by performing channel estimation without any filtering.

4. The method of claim 3, further comprising:
   providing an indication to the UE to enable or disable DM-RS filtering when performing measurements on the DM-RS.

5. The method of claim 4, wherein providing the indication comprises setting a parameter in a control resource set information element, IE, to indicate whether the DM-RS can be subject to filtering by the UE.

6. The method of claim 5, wherein setting the parameter in the control resource set IE comprises setting a dmrs-NoFilteringWithinSlot parameter.

7. The method of claim 4, wherein providing the indication comprises one of:
   setting a parameter in a DM-RS-downlink configuration information element, IE, to indicate whether the DM-RS can be subject to filtering by the UE;
   providing a DM-RS No Filtering Within Slot Activation/Deactivation medium access control, MAC, control element, CE to indicate whether to activate or deactivate no filtering for DM-RS within a slot; and
   providing a downlink control information, DCI, that indicates whether DM-RS no filtering is enabled.

8. The method of claim 4, further comprising dynamically scheduling a physical downlink shared channel for which DM-RS filtering is enabled or disabled by the UE based on the indication.

9. The method of claim 1, wherein switching the polarization of the baseband port comprises one of:
   switching the polarization for hybrid automatic repeat request transmission, HARQ transmission, responsive to a failure of decoding of an initial HARQ transmission or a retransmitted HARQ transmission; and
   switching a polarization of a baseband port associated with a downlink channel based on uplink sounding reference signal, SRS, detection results showing which polarization has a better channel quality for downlink.

10. The method of claim 1, further comprising performing filtering on an uplink channel responsive to determining to provide time diversity on the uplink channel.

11. A network node comprising:
    processing circuitry; and
    memory coupled with the processing circuitry, wherein the memory includes instructions that when executed by the processing circuitry causes the network node to perform operations comprising:
       allocating each user equipment, UE, to a baseband port of a plurality of baseband ports such that there is more than one UE allocated to each of the plurality of baseband ports; and
       for each baseband port of the plurality of baseband ports:
          mapping the baseband port to a polarization of an antenna having multiple polarizations and to one beam of a plurality of beams, wherein a number of the plurality of beams matches a number of the multiple polarizations; and switching the polarization of a baseband port in a time domain to create time diversity of services towards the multiple UEs, wherein a UE is subject to a first polarization for a subset of time occasions and to a second polarization for other time occasions.

12. The network node of claim 11, wherein the memory includes further instructions that when executed by the processing circuitry causes the network node to perform operations of allocating each UE to a baseband port of the plurality of baseband ports comprises allocating each UE to a baseband port in which the UE is located in a coverage area of a respective beam to which the baseband port is mapped.

13. A computer program product comprising a non-transitory storage medium including program code to be executed by processing circuitry of a network node, whereby execution of the program code causes the network node to perform operations comprising:
  allocating each user equipment, UE, to a baseband port of a plurality of baseband ports such that there is more than one UE allocated to each of the plurality of baseband ports; and
  for each baseband port of the plurality of baseband ports:
    mapping the baseband port to a polarization of an antenna having multiple polarizations and to one beam of a plurality of beams, wherein a number of the plurality of beams matches a number of the multiple polarizations; and
    switching the polarization of a baseband port in a time domain to create time diversity of services towards the multiple UEs, wherein a UE is subject to a first polarization for a subset of time occasions and to a second polarization for other time occasions.

14. The computer program product of claim 13, wherein the non-transitory storage medium includes further program code to be executed by the processing circuitry of the network node, whereby execution of the further program code causes the network node to perform operations of allocating each UE to a baseband port of the plurality of baseband ports comprises allocating each UE to a baseband port in which the UE is located in a coverage area of a respective beam to which the baseband port is mapped.

\* \* \* \* \*